United States Patent
Billock et al.

(10) Patent No.: US 6,314,575 B1
(45) Date of Patent: *Nov. 6, 2001

(54) TELECASTING SERVICE FOR PROVIDING VIDEO PROGRAMS ON DEMAND WITH AN INTERACTIVE INTERFACE FOR FACILITATING VIEWER SELECTION OF VIDEO PROGRAMS

(75) Inventors: John K. Billock, Greenwich; Craig D. Cuttner, Norwalk, both of CT (US); Kevin C. Dowdell, New York, NY (US); Elizabeth B. Flanagan, Westfield, NJ (US); James E. Granger, Corte Madera, CA (US); Henry C. Hsu, Port Washington; Robert I. M. Martin, New York, both of NY (US); Robert May, San Francisco, CA (US); Nicolas Peck, Millvalley, CA (US); Michael S. Pontecorvo, San Francisco, CA (US); Bruce E. Probst, Croton On Hudson, NY (US); Marc D. Rosenberg; Debra R. Smul, both of New York, NY (US); Dennis P. Wilkinson, Old Greenwich; Robert M. Zitter, Stamford, both of CT (US)

(73) Assignee: Time Warner Entertainment Company, L.P., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/811,418

(22) Filed: Mar. 4, 1997

Related U.S. Application Data

(63) Continuation of application No. 08/305,847, filed on Sep. 14, 1994, now Pat. No. 5,619,249.

(51) Int. Cl.[7] .................................................. H04N 7/173
(52) U.S. Cl. ................. 725/87; 725/41; 725/42; 725/61
(58) Field of Search .................................... 348/3, 6, 7, 8, 348/9, 10, 12, 13, 906, 563–568; 345/327; 709/217–219; 455/3.1, 3.2, 4.1, 4.2, 5.1; 725/57–61, 86–105

(56) References Cited

U.S. PATENT DOCUMENTS

| 3,886,302 | * | 5/1975 | Kosco ....................................... 348/7 |
| 4,381,522 |   | 4/1983 | Lambert . |

(List continued on next page.)

FOREIGN PATENT DOCUMENTS

| 0 624 039 A2 | 11/1994 | (EP) . |
| A-2 231 244  | 11/1990 | (GB) . |
| WO-A-95/01058 | 1/1995 | (WO) . |

OTHER PUBLICATIONS

James Sorce et al., "Designing a Broadband Residential Entertainment Service: A Case Study," GTE Laboratories Incorporated, 13th International Symposium Human Factors in Telecommunications, Torino, Italy, Sep. 10–14, 1990.

(List continued on next page.)

*Primary Examiner*—Andrew Faile
*Assistant Examiner*—Reuben Brown
(74) *Attorney, Agent, or Firm*—Fish & Neave; Gary J. Tuma

(57) ABSTRACT

A telecasting service is provided that offers video programs upon viewer demand, and which includes an interactive interface for facilitating viewer selection of video programs. The interactive interface allows the viewer to scan through a list of video programs available on the demand telecasting service. The interactive interface also provides the viewer with still images, full-motion previews, and textual descriptions of the available programs. The demand telecasting service distinguishes subscribers from non-subscribers, and provides an interactive facility for allowing non-subscribers to subscribe to the system.

56 Claims, 16 Drawing Sheets

U.S. PATENT DOCUMENTS

| | | |
|---|---|---|
| 4,430,669 | 2/1984 | Cheung . |
| 4,506,387 | 3/1985 | Walter . |
| 4,685,131 * | 8/1987 | Horne ................................. 348/7 |
| 4,739,510 * | 4/1988 | Jeffers et al. ..................... 380/234 |
| 4,896,347 | 1/1990 | Auber . |
| 4,920,432 | 4/1990 | Eggers et al. . |
| 5,003,384 | 3/1991 | Durden et al. . |
| 5,027,400 | 6/1991 | Baji et al. . |
| 5,109,482 | 4/1992 | Bohrman . |
| 5,241,671 | 8/1993 | Reed et al. . |
| 5,245,420 | 9/1993 | Harney et al. . |
| 5,251,294 | 10/1993 | Abelow . |
| 5,353,121 | 10/1994 | Young et al. . |
| 5,357,276 | 10/1994 | Banker et al. . |
| 5,410,343 | 4/1995 | Coddington et al. . |
| 5,412,720 | 5/1995 | Hoarty . |
| 5,544,354 | 8/1996 | May et al. . |
| 5,604,528 * | 2/1997 | Edwards et al. .................. 725/25 |
| 5,619,249 * | 4/1997 | Billock et al. ..................... 348/7 |

OTHER PUBLICATIONS

A. D. Gelman et al., "A Store–and–Forward Architecture for Video–On–Demand Service," International Conference on Communications, Denver, Colorado, USA, Jun. 23–26, 1991, Communications: Rising to the Heights, vol. 2 of 3, pp. 842–46, Jun. 23, 1991.

W. Leo Hoarty, "Multimedia on Cable Television Systems," 18th International Television Symposium and Technical Exhibition, Montreux, Switzerland, Jun. 10–15, 1993, Cable TV Sessions, No. 18, pp. 556–67, Jun. 11, 1993.

Mike Langberg, "CD–ROM Attracts Heavy Hitters," San Jose Mercury News, Mar. 2, 1994, at 1.

Matthew D. Miller, "A Scenario for the Deployment of Interactive Multimedia Cable Television Systems in the United States in the 1990's," Proceedings of the IEEE, vol. 82, No. 4, pp. 585–89, Apr. 1994.

Yee–Hsiang Chang et al., "An Open–Systems Approach to Video on Demand," IEEE Communications Magazine, vol. 32, No. 5, pp. 68–80, May 1994.

* cited by examiner

FIG. 3

| PROGRAM_ID |
| --- |
| PROGRAM_NAME |
| CATEGORY |
| CLASSIFICATION |
| DESCRIPTION |
| STILL_IMAGE |
| PREVIEW_VIDEO |
| PREVIEW_AUDIO |
| FULL_VIDEO |
| FULL_AUDIO |

FIG. 4

| STATION_ID |
|---|
| VIEWER_ID |
| CLASSIFICATION |

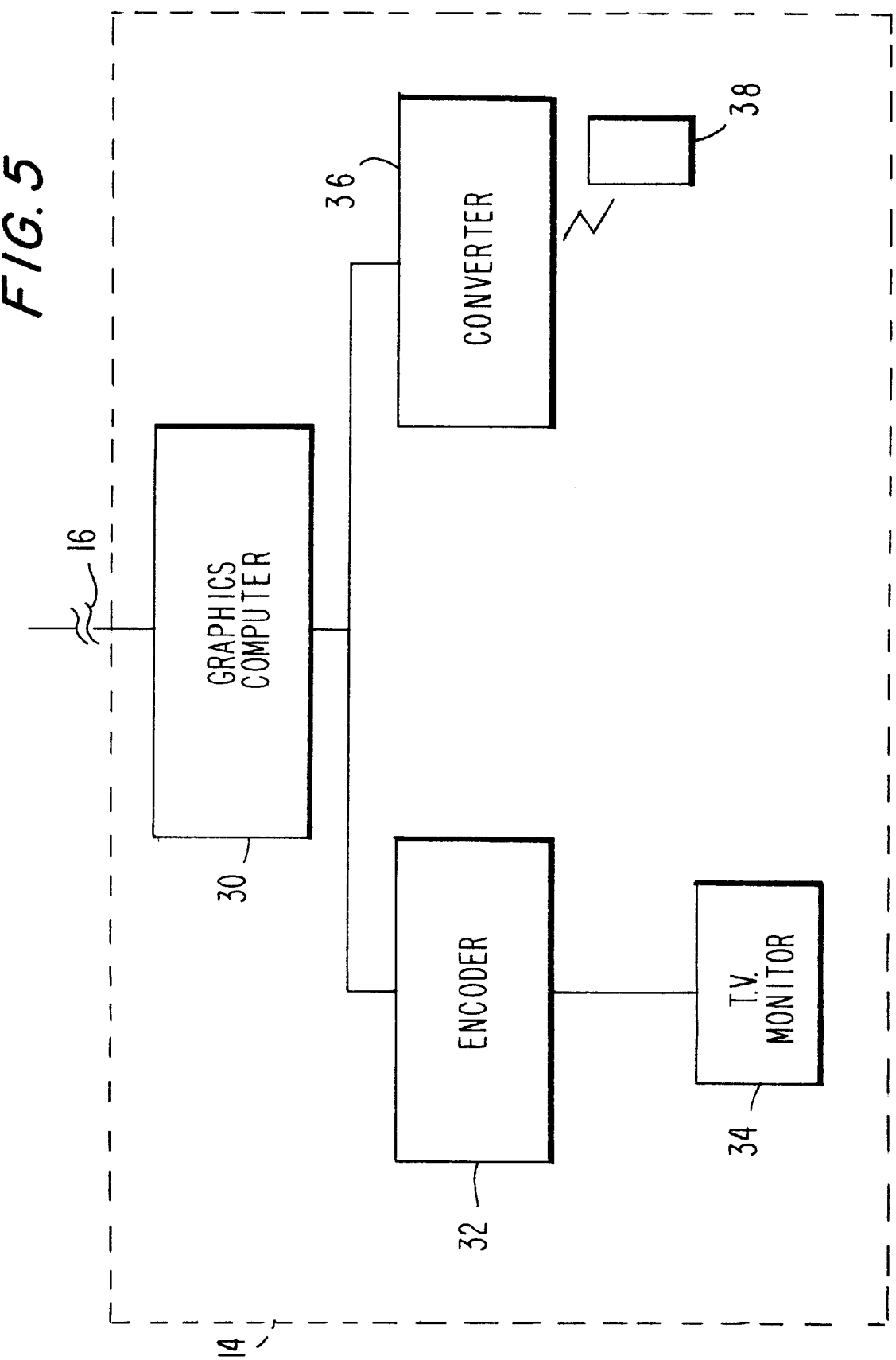

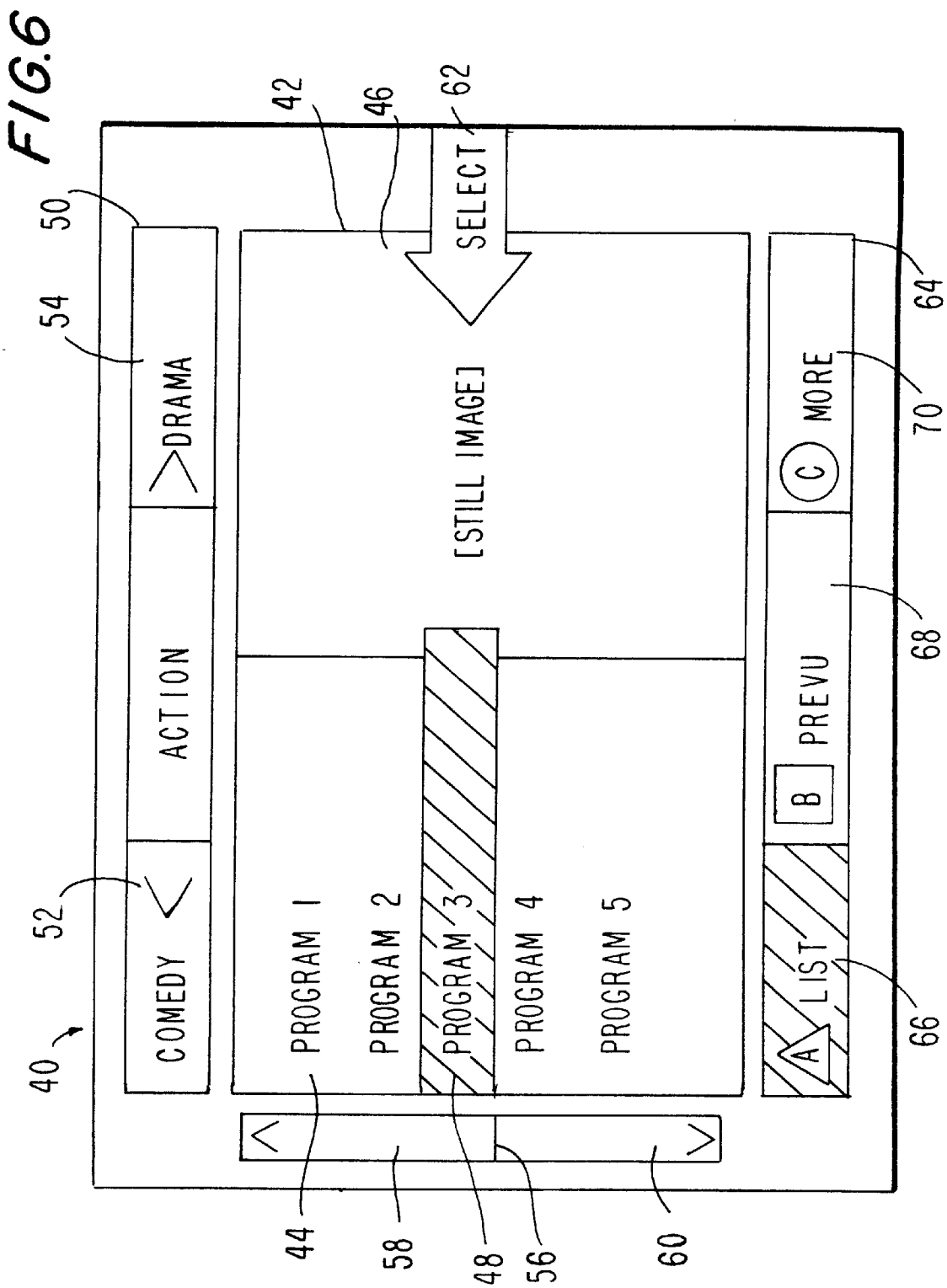

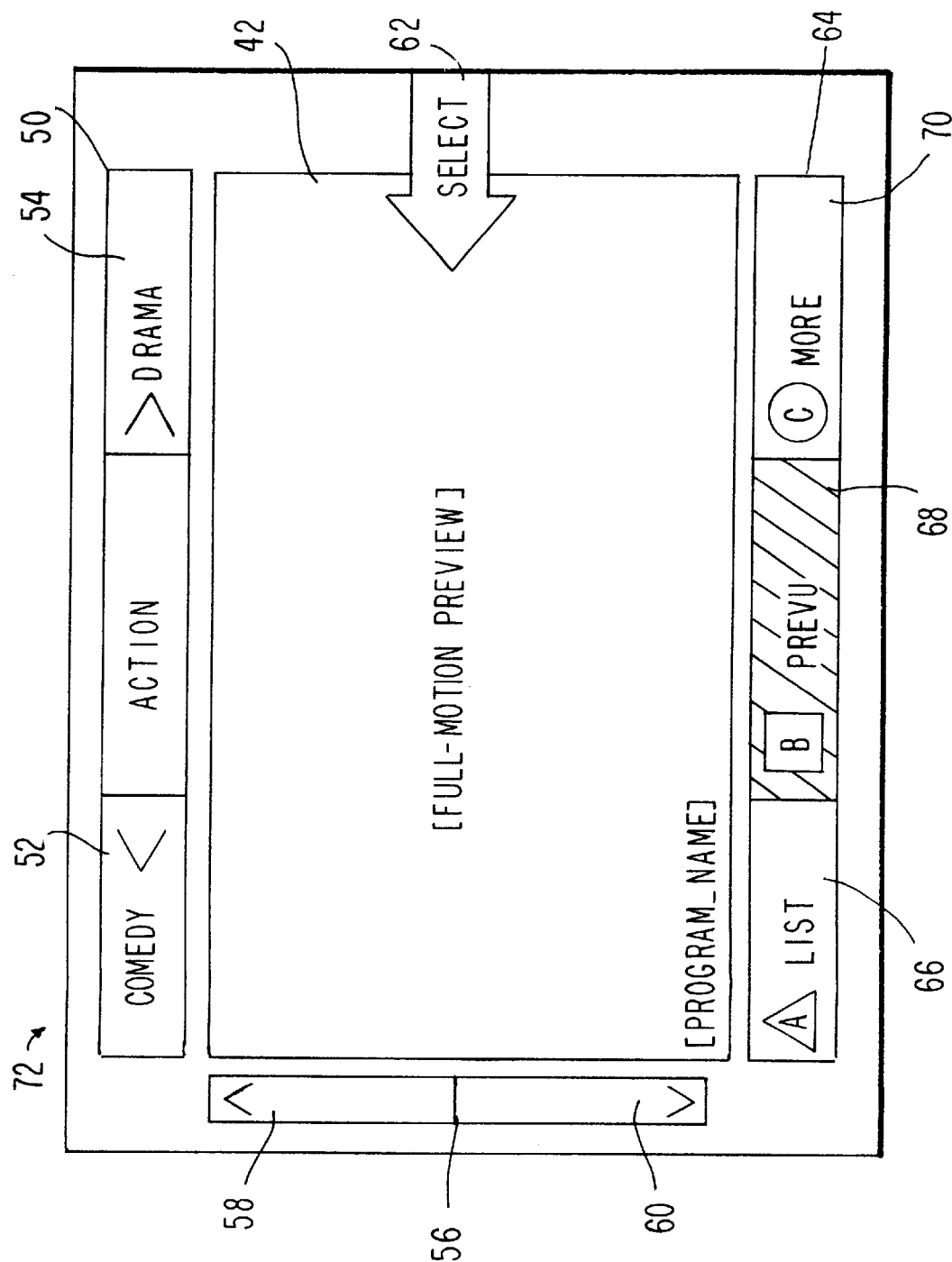

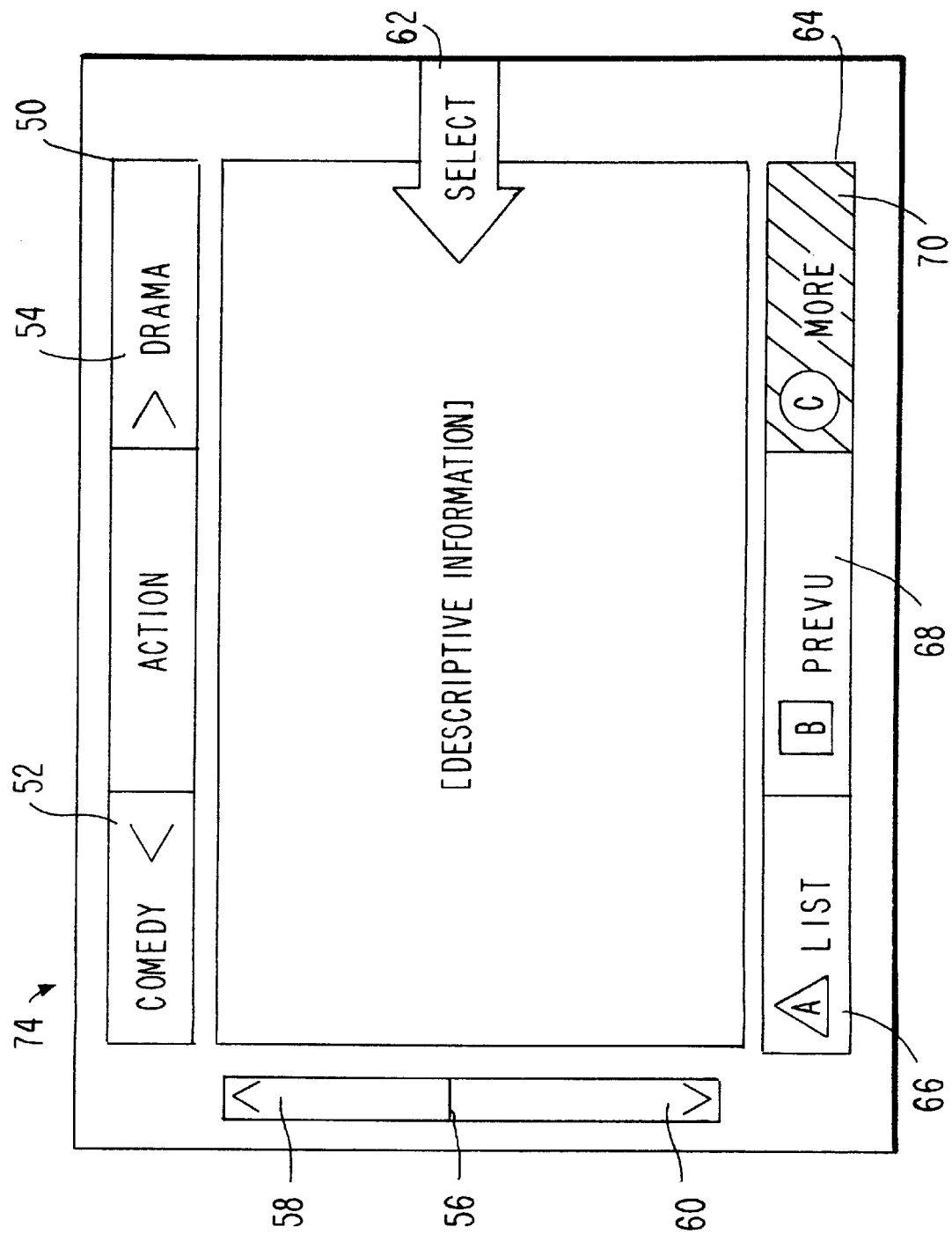

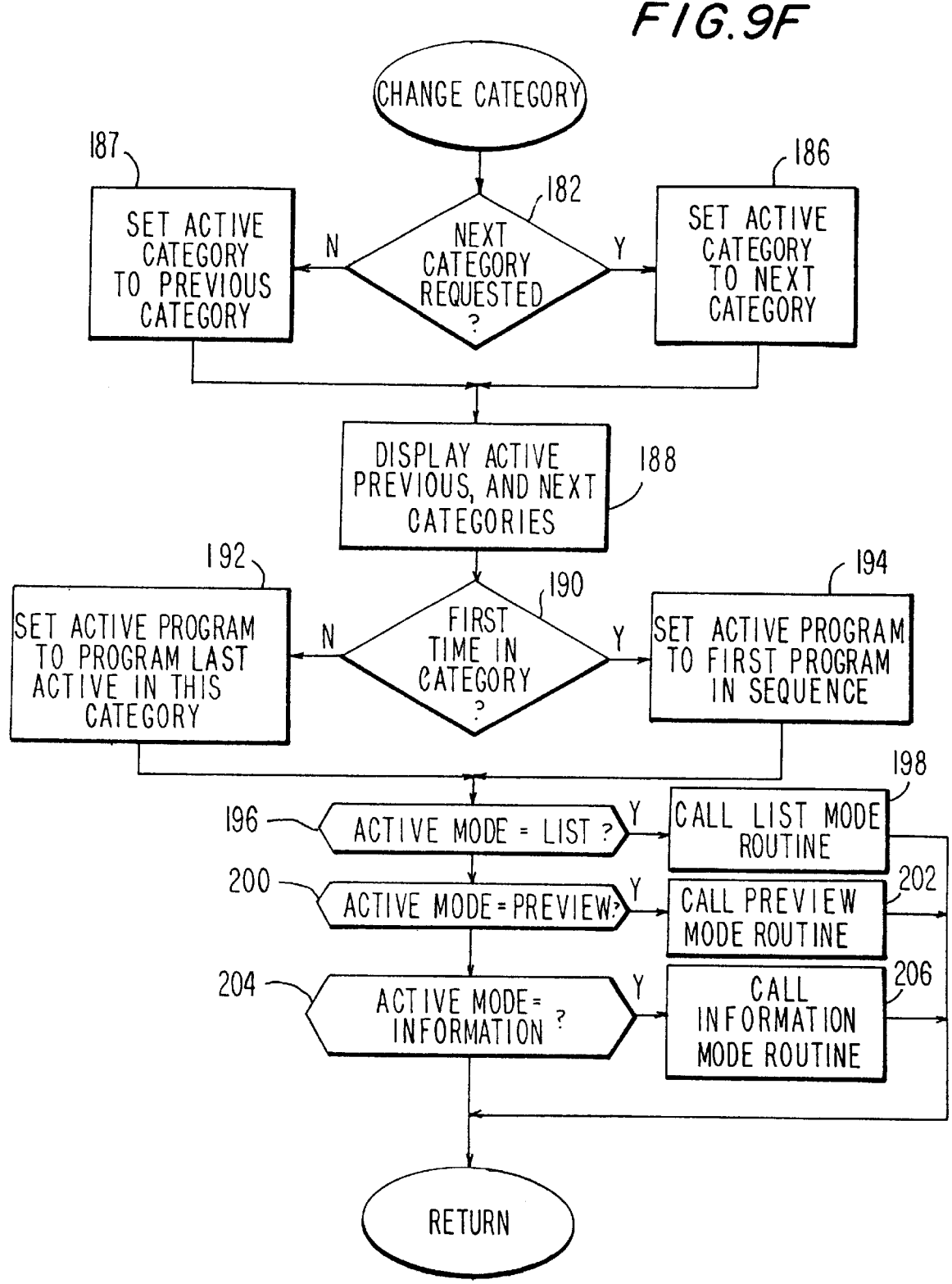

TELECASTING SERVICE FOR PROVIDING VIDEO PROGRAMS ON DEMAND WITH AN INTERACTIVE INTERFACE FOR FACILITATING VIEWER SELECTION OF VIDEO PROGRAMS

CROSS REFERENCE TO RELATED APPLICATION

This is a continuation of U.S. patent application Ser. No. 08/305,847, filed Sep. 14, 1994, entitled TELECASTING SERVICE FOR PROVIDING VIDEO PROGRAMS ON DEMAND WITH AN INTERACTIVE INTERFACE FOR FACILITATING VIEWER SELECTION OF VIDEO PROGRAMS, now U.S. Pat. No. 5,619,249.

BACKGROUND OF THE INVENTION

This invention relates to telecasting systems and particularly to telecasting systems that provide video programs which may be viewed on conventional televisions or other suitable video monitors. More particularly, this invention is directed toward a telecasting service that provides video programs upon viewer demand, and which includes an interactive interface for facilitating viewer selection of video programs.

Television viewing has become an increasingly popular pastime over the past several decades. Commercial and public broadcasting stations and cable networks provide viewers with entertainment programming, educational programming, as well as programming dedicated to news, weather, and commercial advertising. But programming variety is not the only reason for the popularity of television—the convenience of television also contributes substantially to its popularity. Indeed, nearly every household in the United States is equipped with at least one (and commonly several) television sets. It is not surprising that many people take advantage of the convenience of television instead of wasting valuable time seeking out other forms of entertainment.

Early telecasting systems relied almost exclusively on aerial transmissions to deliver video programs to the viewers' television sets. Many difficulties led to the demise of aerial broadcasting as the dominant video delivery system. For example, the quality of aerial broadcasts varies considerably depending on atmospheric conditions and the viewer's geographic location. But more importantly, aerial broadcasting systems could not keep up with viewer demands for increased variety, because of the limited bandwidth available for aerial transmissions.

In response to the difficulties associated with aerial broadcasting systems, cable telecasting systems have been developed, and they have become the telecasting systems of choice in areas where they are available. Cable telecasting systems provide consistent, high quality transmissions of video programming. They also offer greater variety than aerial systems because more bandwidth is available on cable networks. For example, whereas most viewers receive only a few aerial programming channels, typical cable telecasting systems currently provide 30–75 different programming channels, and systems with even greater channel capacity have been launched in certain areas.

In most cable telecasting systems, a central telecasting facility is coupled to the subscribing viewers' television sets through a communication network. Most current networks use coaxial cable as the communication medium. However, an increasing number of cable telecasting systems are migrating to fiber optic networks. Fiber optic networks offer substantially greater bandwidth than coaxial networks, which has created the opportunity for even more programming variety than is currently available. Indeed, a cable telecasting system based on a fiber optic network can support hundreds of programming channels, as compared to the typical few dozen channels offered by coaxial cable-based systems.

The increased program variety offered by modern cable telecasting systems is advantageous because it gives the viewer a wider selection of video programs to choose from at any given time. However, no matter how many different programs are available, the viewer's selection has to date been limited to the programs that are being exhibited at any particular time. The viewer thus has been constrained by a predetermined program schedule, which may be undesirable in some situations. For example, television viewers are frequently forced to choose between watching a program of particular interest or engaging in an activity that temporally conflicts with the program of interest. Of course, the viewer may choose to record the program, but this is often a cumbersome task, especially if a video recorder is not immediately available.

Many viewers overcome scheduling conflicts by renting video programs. Although video rental establishments typically offer a wide variety of programs to choose from, the process of renting video programs is rather inconvenient. As a result, a large number viewers may forego viewing a particular program of interest until it is scheduled on one of the program channels—which may not occur until sometime in the distant future, if at all.

In view of the foregoing, it would be desirable to provide a demand telecasting service which allows a viewer to select a video program from a plurality of available programs, and which telecasts the selected program substantially at the time the viewer makes the program selection.

It would also be desirable to provide a telecasting service that includes an interactive interface which allows a viewer to review a list of available video programs and which facilitates the viewer's selection of a desired program.

It would further be desirable to provide a telecasting service that allows a viewer to preview a segment of a video program before viewing the entire video program.

It would even further be desirable to provide a telecasting service that distinguishes subscribers from non-subscribers, which allows even non-subscribers to preview a segment of a video program, but allows only subscribers to view the entire video program.

SUMMARY OF THE INVENTION

It is an object of this invention to provide a demand telecasting service which allows a viewer to select a video program from a plurality of available programs, and which telecasts the selected program substantially at the time the viewer makes the program selection.

It is also an object of this invention to provide a telecasting service that includes an interactive interface which allows a viewer to review a list of available video programs and which facilitates the viewer's selection of a desired program.

It is a further object of this invention to provide a telecasting service that allows a viewer to preview a segment of a video program before viewing the entire video program.

It is even a further object of this invention to provide a telecasting service that distinguishes subscribers from non-subscribers, which allows even non-subscribers to preview a segment of a video program, but allows only subscribers to view the entire video program.

In accordance with this invention, there is provided a demand telecasting service for telecasting video programs for display on a television or other suitable video display. The demand telecasting service allows a viewer to select from among a plurality of programs that are available substantially at the time of viewer selection. The demand telecasting service provides an interactive interface for facilitating viewer selection of a program. The interactive interface includes a memory for storing a list of available programs and a segment of each program in the list, a display generator for displaying the list on the display, and a viewer control unit that is used by the viewer to select one of the programs on the list, to initiate display of the selected program, and to initiate display of one of the segments corresponding to the selected program. After selecting one of the programs from the list and before initiating display of the selected program, the viewer can preview the selected program by initiating display of the segment corresponding to the selected program.

In order to distinguish subscribers from non-subscribers, the memory of the interactive interface can further store a list of identifiers corresponding to subscribing viewers. The viewer control unit transmits an identifier corresponding to a viewer using the viewer control unit. The interactive interface further comprises a validator for comparing the transmitted identifier to the list of identifiers corresponding to subscribing viewers. When the transmitted identifier does not match any identifier on the list of identifiers, the validator prevents display of the selected program, but allows the viewer to preview the segment corresponding to the selected program.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which:

FIGS. 3 and 4 are tables containing lists of data items stored in the mass storage system shown in FIG. 2;

FIG. 5 is a more detailed block diagram of one of the viewing stations shown in FIG. 1;

FIGS. 6–8 are sample screen displays which illustrate the operation of the interactive interface of the present invention; and FIGS. 9A–9H are logic flow diagrams representing a control program used to implement the interactive interface of the present invention.

DETAILED DESCRIPTION OF THE INVENTION

Figure 1:
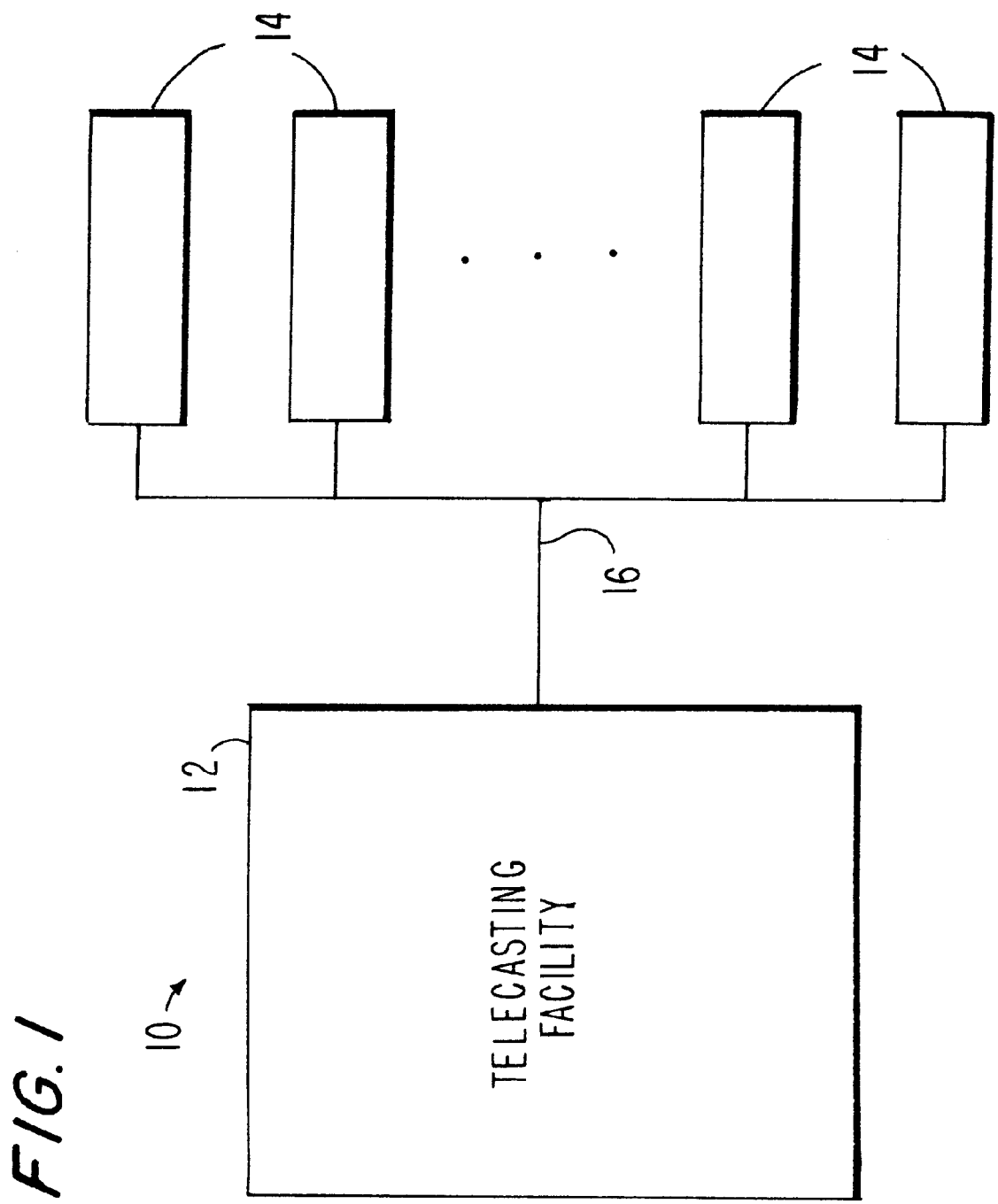
FIG. 1 is a block diagram of a cable telecasting network within which the demand telecasting service of the present invention may be implemented.

Referring first to FIG. 1, a cable telecasting network 10 is described, within which the demand telecasting service of the present invention may be implemented. The network 10 includes a telecasting facility 12, and a plurality of viewing stations 14. A communication medium 16 couples the telecasting facility 12 to the viewing stations 14. The communication medium 16 may be any medium that is suitable for delivering signals over long distances between the telecasting facility 12 and the viewing stations 14. Preferably, the communication medium 16 is fiber optic cable, although other media (such as coaxial cable) may be used instead.

In many respects, the network 10 operates in a conventional manner to make video programs available for viewing on the viewing stations 14. The telecasting facility 12 preferably includes a central transmitting station that transmits video programs to the viewing stations 14 via the communication medium 16. The viewing stations 14 are typically located in the viewers' homes or other locations that are convenient for viewing video programs. Each of the viewing stations 14 preferably includes a conventional television monitor or other suitable video display.

The telecasting facility 12 preferably telecasts a plurality of video programs simultaneously over a plurality of programming channels on the communication medium 16. All of the viewing stations 14 on the network 10 have access to the plurality of programs that are telecast by the telecasting facility 12. A viewer can view a particular video program by tuning one of the viewing stations 14 to the programming channel that is carrying the program of interest.

However, unlike conventional telecasting networks, the network 10 permits bi-directional communication between the telecasting facility 12 and each of the viewing stations 14 over the communication medium 16. Preferably, at least one of the plurality of programming channels is used for interactive applications, like the demand telecasting service of the present invention. However, it should be understood that a plurality of programming channels may be used for the demand telecasting service without departing from the spirit of the invention.

When the viewer tunes one of the viewing stations 14 to the interactive channel, commands may be sent from that viewing station 14 to the telecasting facility 12. As described in detail below, such commands may include a program selection command that causes the telecasting facility 12 to telecast a program of interest on the interactive channel substantially at the time that the command is transmitted. Although all of the viewing stations 14 receive all of the signals telecast on the interactive channel, only the viewing station 14 that is used to select a particular program displays the selected program. The use of the interactive channel by one of the viewing stations 14 does not interfere with the use of the interactive channel by another one of the viewing stations 14. Thus, many different viewing stations 14 on the network 10 may be used to view different interactively selected programs at the same time.

Figure 2:
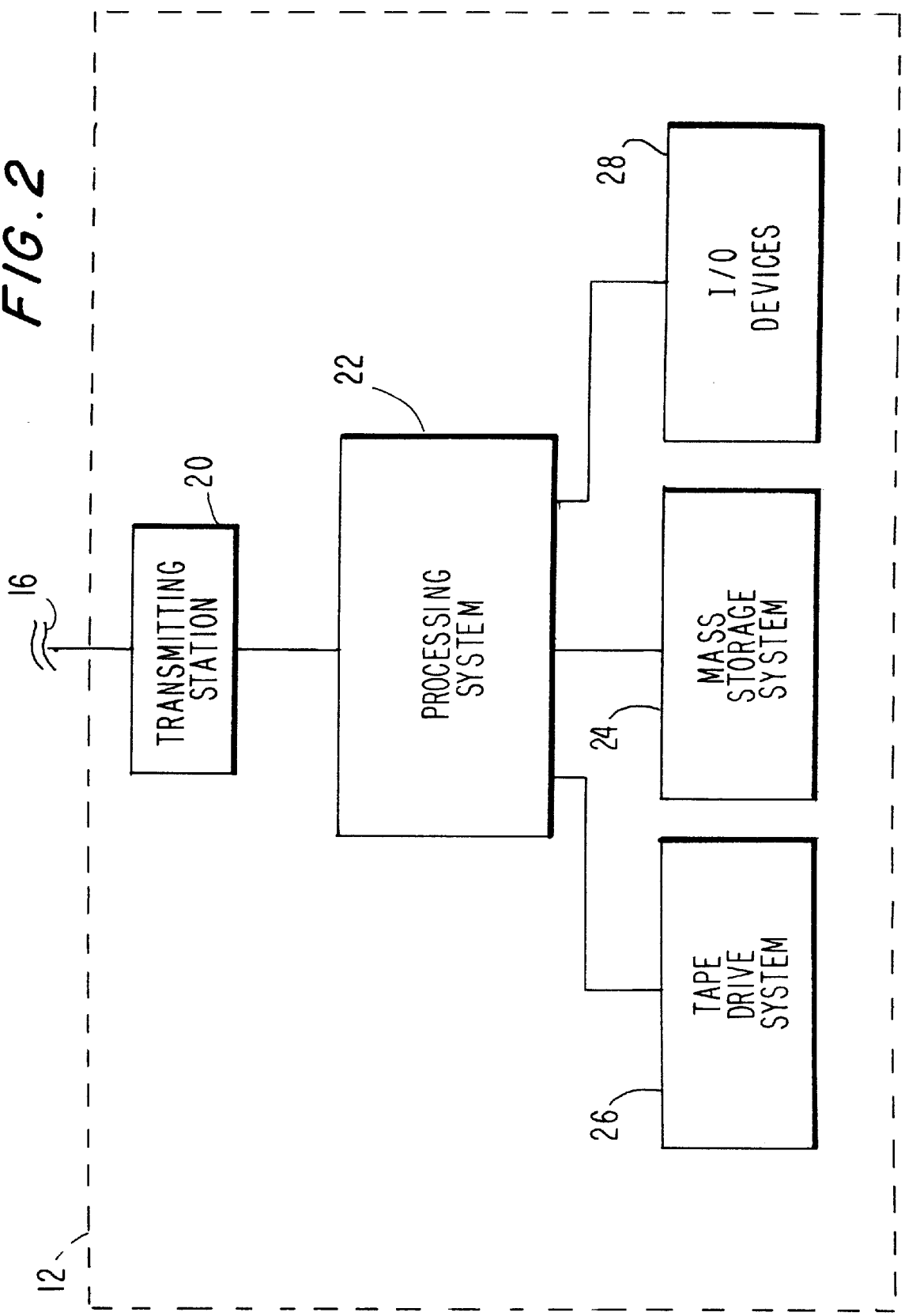
FIG. 2 is a more detailed block diagram of the telecasting facility shown in FIG. 1.

Referring now to FIG. 2, a preferred embodiment of a telecasting facility is described that is suitable for use as the telecasting facility 12 shown in FIG. 1. As mentioned above, the telecasting facility 12 includes a transmitting station 20 that transmits video programs to the viewing stations 14 (FIG. 1) over a plurality of programming channels on the communication medium 16 in a conventional manner. However, in order to implement the demand telecasting service of the present invention, the telecasting facility 12 also includes a processing system 22 coupled to the transmitting station 20, a mass storage system 24, a tape drive system 26, and conventional I/O devices 28 (such as a keyboard, display monitor, and mouse). The mass storage system 24, the tape drive system 26, and the I/O devices 28 are considered peripheral components of the processing system 22.

The processing system 22 is preferably a multiple processor computer system that is capable of handling many programing requests that may be received from the viewing stations 14 (FIG. 1) over the communication medium 16 on the interactive channel. Such requests are initially received by the transmitting station 20 and are subsequently passed on to the processing system 22. In a preferred embodiment, the processing system 22 is a network of at least eight Challenge computer systems available from Silicon Graphics, Inc., located in Mountain View, Calif. Each Challenge computer is preferably equipped with at least eight processors operating in parallel, thus providing the processing system 22 with at least 64 processors for handling programming requests.

The mass storage system 24 is preferably an array of high performance disk drives. Alternatively, other types of data storage systems can be used, such as CD-ROM systems.

The tape drive system 26 is preferably a multi-component system that includes a tape storage unit (not shown), a plurality of tape players (not shown), and an automatic tape retrieval unit (not shown). When a request for a video program is received, the processing system 22 instructs the automatic tape retrieval unit to retrieve the tape containing the selected video program from the appropriate location in the tape storage unit. The automatic tape retrieval unit then inserts the tape into an available tape drive, which in turn plays the tape to be telecast. As the tape is played, the video program data (video and audio) is transferred to the mass storage system 24 for temporary storage, after which the program is telecast to the viewing station 14 (FIG. 1) from which the viewer made the selection. When the tape has finished playing, the automatic tape retrieval unit returns the tape to the appropriate location.

The tape drive system 26 preferably accommodates professional recording tapes, such digital linear tapes (DLTs), although systems which accommodate other types of media (such as conventional video tapes, digital audio tapes (DATs), video disks, etc.) may be used instead. A suitable automated tape drive system that uses DLTs is available from Digital Equipment Corporation, located in Maynard, Mass. It should be noted, however, that a manual tape storage and retrieval system may be used without departing from the spirit of the invention.

Preferably, the telecasting facility 12 receives tapes containing the video and audio portions of new video programs on a periodic basis (e.g., monthly). The video portion of each video program is preferably stored in a compressed format in accordance with the MPEG-1 video compression standard established by the Motion Picture Experts Group. The tapes are loaded into the storage unit of the tape drive system 26, into locations that may be predetermined by the supplier of the tapes. If a particular redetermined location is occupied, another location may be used, as long as the processing system 22 has information reflecting the actual tape location.

The mass storage system 24 stores many data files used in connection with the demand telecasting service of the present invention. These data files include data files for storing the video and audio portions of frequently selected video programs, data files for storing the video and audio portions of full-motion previews from the available video programs, and data files for storing still images from the available video programs. The mass storage system 24 also stores additional data (described below in connection with FIGS. 3 and 4) associated with each available video program and each subscribing viewing station 14 (FIG. 1). Further, as mentioned above, the mass storage system 24 temporarily stores data files containing the audio and video portions of programs that have been transferred from tape in response to viewer selections. The still image data, and the video portions of the full-length video programs and full-motion previews are preferably stored in a compressed format in accordance with the MPEG-1 standard.

The full-motion preview data and the still image data are preferably received on tape along with the tapes containing the corresponding full-length video programs. The full-motion preview data and the still image data for each available program are preferably transferred to the mass storage system 24 at the time the corresponding video program tapes are loaded into the tape storage unit of the tape drive system 26.

When a video program needs to be retrieved from the tape storage unit, the viewer may experience a noticeable delay between the time of selection and the time the program is exhibited. By storing the data for frequently selected programs in the mass storage system 24 on a long-term basis, the telecasting facility 12 is able to service requests for such programs more rapidly than would otherwise be the case. Indeed, if there is sufficient storage space, it may be preferable to store the entire program library in the mass storage system 24, to eliminate the delays associated with the use of the tape drive system 26.

The processing system 22 receives requests for available video programs from the viewing stations 14 (FIG. 1). In a large telecasting network, it should be expected that the processing system 22 will be called upon to service a large number of requests within relatively short periods of time. In order to promptly service a large number of requests, the processing system 22 preferably uses the asynchronous transfer mode (ATM) protocol to manage data flow on the communication medium 16. In accordance with the ATM protocol, the telecasting facility 12 and each of the viewing stations 14 (FIG. 1) are assigned time slots during which they are permitted to transmit data on the communication medium 16. Data to be transmitted by a particular device are buffered by that device in a conventional manner until its time slot is reached. When its time slot is reached, the transmitting device transmits the data, along with an address that identifies the device that is to receive the data.

When large amounts of data need to be transmitted, such as when the telecasting facility 12 needs to transmit an entire video program to one of the viewing stations 14 (FIG. 1), the data are divided into smaller packets which are transmitted during different time slots. Each packet is transmitted with a destination address. The destination device receives and reassembles the packets as required. The telecasting facility 12 transmits packets at a rate that allows the receiving viewing station 14 (FIG. 1) to present an uninterrupted video program to the viewer.

Figure 4:
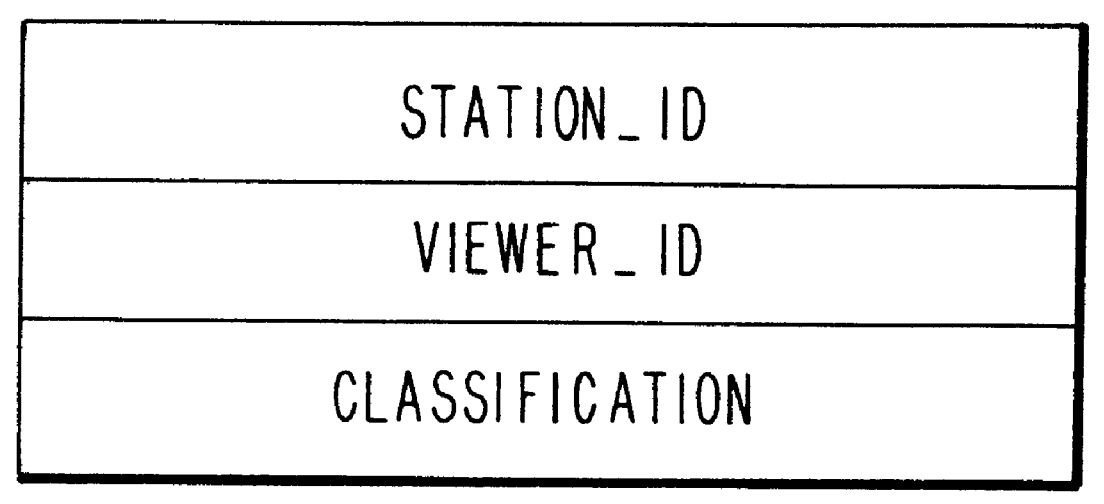

FIGS. 3 and 4 are tables that list data items that are representative of data that are stored in the mass storage system 24 (FIG. 2) (in addition to the files containing the full-length video data, the full-motion preview data, and the still image data). The data represented by the tables shown in FIGS. 3 and 4 are preferably stored in conventional database tables.

The data items listed in FIG. 3 represent data that are stored in connection with each stored video program. This data is preferably transferred to the mass storage system 24 (FIG. 2) each time new video program tapes are received by the telecasting facility 12 (FIG. 2). This may be accomplished through a tape transfer (similar to the full-motion preview data and the still image data), or through a direct transfer from the video program supplier (e.g., through a modem connection).

The data item "PROGRAM_ID" represents a unique identifier that is associated with each available video program. As explained below, viewer requests for video programs are accomplished by the transmission of the PROGRAM_ID associated with the desired program from one of the viewing stations 14 (FIG. 1) to the processing system 22 (FIG. 2). A numerical identifier is preferred as the PROGRAM_ID to facilitate rapid processing of viewer requests.

The data item "PROGRAM_NAME" preferably represents a text field that contains the commonly known name of an available video program.

The data item "CATEGORY" preferably represents a text field that contains the name of one of several categories to which a video program may be assigned. Typical categories for video programs may include "action," "drama," "sports," etc. Preferably, the CATEGORY field can support multiple category assignments for each video program. Thus, some video programs may appear in the program listings for two or more categories. For example, a recently released comedy program may be assigned to a "comedy" category, as well as a special category designated "new releases."

The data item "CLASSIFICATION" is used to further categorize each video program. One particularly useful classification scheme distinguishes video programs that are suitable for children from those that are not. As explained below, this data item may be used to limit certain viewers' program choices.

The data item "DESCRIPTION" represents a text field that contains information that may be helpful to a viewer when searching for a particular video program of interest. Some examples of this type of information include the names of the performers, the name of the director, the length of the video program, and a brief description of the content of the video program. Other useful information may be added, as appropriate.

The data item "STILL_IMAGE" represents a text field that contains the name of a data file stored in the mass storage system 24 (FIG. 2) that contains image data that is used to provide the viewer with a still image from a video program. The still image is provided to the viewer (in a manner described below) as an aid to selecting a program of interest.

The data items "PREVIEW VIDEO" and "PREVIEW_AUDIO" are text fields that represent the names of data files stored in the mass storage system 24 (FIG. 2) that contain the video and audio portions of a short segment of a video program. The short segment of the video program is provided to the viewer (in a manner described below) as an aid to selecting a program of interest.

The data items "FULL_VIDEO" and "FULL_AUDIO" are text fields that represent data that are used by the processing system 22 (FIG. 2) to determine the location of a selected video program. If the video program is one that is stored on a long-term basis in the mass storage system 24 (FIG. 2), the FULL_VIDEO and FULL_AUDIO data items represent the names of the data files containing the full video and audio portions of the video program. Otherwise, the FULL_VIDEO data item represents a location in the tape storage unit of the tape drive system 26 (FIG. 2) where the tape containing the video program is stored. The FULL_AUDIO data item is not used in this situation.

The data items listed in FIG. 4 represent data that pertain to the viewing stations 14 (FIG. 1) that are connected to the network 10 (FIG. 1). This information may be entered by an operator using the I/O devices 28 (FIG. 2).

The data item "STATION_ID" preferably represents a numeric field that contains a unique identifier for each of the viewing stations 14 (FIG. 1) that have subscribed to the demand telecasting service of the present invention. The station identifiers are used by the processing system 22 (FIG. 2) as the destination addresses for data packets transmitted on the communication medium 16 (FIG. 2).

The data item "VIEWER_ID" represents a text field that contains a unique identifier for each person that is permitted to use a particular viewing station 14 (FIG. 1).

The data item "CLASSIFICATION" is similar to the data item of the same name described in connection with FIG. 3. However, the purpose here is to define the classes of video programs that a particular viewer (as identified by the VIEWER_ID) is permitted to watch.

Referring now to FIG. 5, a preferred embodiment of a viewing station is described that is suitable for use as one of the viewing stations 14 shown in FIG. 1. The viewing station 14 includes a graphics computer 30, a video encoder 32, a television monitor 34, a signal converter 36, and a remote viewer control unit 38. It should be understood that some or all of these components, especially the graphics computer 30, the video encoder 32, and the signal converter 36, may be combined into a single device without departing from the spirit of the invention.

The graphics computer 30 performs the graphics functions required to implement the interactive interface of the present invention. The graphics computer 30 also performs the communications functions for the viewing station 14, including transmitting data packets to, and receiving data packets from, the telecasting facility 12 (FIG. 2). In a preferred embodiment, the graphics computer 30 is an R4000PC Indy computer available from Silicon Graphics, Inc. The Indy computer is preferably equipped with 8 megabytes of memory, a Newport graphics card, and an A/V card which provides an audio and video interface between the graphics computer 30 and the signal converter 36.

The graphics computer 30 receives several different types of information in packets from the telecasting facility 12 (FIG. 2) over the interactive channel on the communication medium 16. This information includes-the video and audio portions of video programs selected by the viewer, the video and audio portions of short segments of the video programs, still images from the video programs, textual descriptions of the available video programs, and listings of the available video programs. As explained below, this information is presented to the viewer through the use of a convenient interactive interface.

Information received by the viewing station 14 is initially processed by the graphics computer 30. Such processing steps may include reassembling of data packets, decompression of the compressed video portions of the video programs and short segments of the video programs, and synchronization of the video and audio portions of the video programs and the short segments of the video programs. These processing steps may be performed in a conventional manner.

The information processed by the graphics computer 30 that is to be made available to the viewer (e.g., video programs, short segments, still images, program lists, etc.) is sent to the video encoder 32. The video encoder 32 is preferably a 2826 Video Encoder II available from RasterOps, Inc., located in Santa Clara; Calif. The video encoder 32 converts the information from the native format of the graphics computer 30 to a television standard format such as NTSC, PAL, or SECAM, as appropriate. Converting the information to the appropriate format renders the information suitable for viewing on the conventional television monitor 34.

The viewer can communicate with the graphics computer 30 through the use of the combination of the signal converter 36 and the remote viewer control unit 38. In many respects, the control unit 38 is similar to conventional remote control units that are commonly used with audio-visual equipment. However, the control unit 38 includes buttons that are used in connection with the interactive interface of the present invention, as described below.

Preferably, the control unit 38 transmits infrared signals to the signal converter 36 in response to commands entered by the viewer. The signal converter 36 receives the infrared signals and converts them to electrical signals suitable for transmission to the graphics computer 30. In a preferred embodiment, the signal converter 36 is an 8600 Converter available from Scientific-Atlanta, Inc., located in Atlanta, Ga.

The graphics computer 30 is programmed to provide an interactive interface that is intended to facilitate the viewer's selection of a video program. The interactive interface facilitates the viewer's program selection by organizing the programs available for selection into a convenient menu, and by providing the viewer with helpful selection aids, including still images, short segment previews, and textual descriptions of the available programs. The interactive interface may be understood by reference to the screen examples shown in FIGS. 6–8.

The interactive interface preferably operates in three modes—a list mode, a preview mode, and an information mode. FIG. 6 depicts a list mode screen 40 that appears on the television monitor 34 when the interactive interface is operating in the list mode. The list mode screen 40 is preferably the first screen displayed after the viewer logs into the interactive interface.

In the center of the list mode screen 40 is a display window 42. In the list mode, the display window 42 is preferably divided into a menu window 44 (on the left side) and a still image window 46 (on the right side). The menu window 44 displays a list of video programs that are available for viewer selection. The list of video programs is transmitted from the telecasting facility 12 (FIG. 1) to the viewing station 14 (FIG. 1) that the viewer is using.

At any given time, one of the video programs in the menu window 44 is highlighted by an active program bar 48. When the list mode screen 40 first appears after start-up, the active program bar 48 highlights the first program in the list. The video program highlighted by the active program bar 48 is deemed the "active program."

The interactive interface provides several program selection tools that may used by the viewer to learn more about the active program. One such tool requires no viewer interaction—a still image of the active program automatically appears in the still image window 46. The still image may aid the viewer in identifying or remembering the subject matter of the active program. Data files used to display the still images corresponding to each available video program are transmitted to the viewing station 14 (FIG. 1) being used along with the list of video programs.

In order to simplify the program selection process, the available video programs are organized into categories, as described above in connection with FIG. 3. Only the programs in an "active category" appear in the menu window 44 at any given time. The name of the active category appears in the center of a category selection bar 50 which is displayed above the display window 42. When the list mode screen 40 is first displayed after start-up, the first category in a sequence of available categories is the active category. The list of categories is transmitted to the viewing station 14 (FIG. 1) being used along with the list of available video programs.

The category selection bar 50 also includes two actuators that are used to change the active category—a previous category actuator 52 and a next category actuator 54. In general, the various actuators described below in connection with the screens shown in FIGS. 6–8 preferably correspond to buttons on the control unit 38 (FIG. 5). In order to activate a particular actuator, the viewer simply presses the corresponding button on the control unit 38 (FIG. 5). Alternatively, the control unit 38 (FIG. 5) may include a highlighting device for activating some or all of the various actuators. It should be understood that the labels which appear in FIGS. 6–8 to denote the various actuators may be modified without departing from the spirit of the invention.

The previous category actuator 52 is used by the viewer to change the active category to the preceding category in the sequence of categories. The next category actuator 54 is used to advance the active category to the next category in the sequence. When either the previous category actuator 52 or the next category actuator 54 is used, the category name displayed in the center of the category selection bar 50, and the list of programs displayed in the menu window 44, change accordingly. Both the previous category actuator 52 and the next category actuator 54 conveniently display the name of the category that will be the active category if the corresponding actuator is activated. Preferably, the category actuators operate in an endless loop fashion.

Along the left side of the display window 42 is a program selection bar 56. The program selection bar 56 includes two actuators for changing the active program—a previous program actuator 58 and a next program actuator 60. The previous program actuator 58 and the next program actuator 60 operate in a manner similar to that of the previous category actuator 52 and the next category actuator 54. Specifically, the viewer can move backward and forward in the list of programs displayed in the menu window 44 through the use of the previous program actuator 58 and the next program actuator 60.

Typically, only a subset of the programs in the active category can be displayed in the menu window 44 at any given time. To view other program titles, the viewer may use the previous program actuator 58 and the next program actuator 60 to cause the displayed list of programs to scroll backward and forward, respectively, through the complete list of programs within the active category. The previous program actuator 58 and the next program actuator 60 preferably operate in an endless loop fashion.

Preferably, the interactive interface stores a pointer to the most recently active program in each category. Thus, if the viewer leaves a first category to scan programs in a second category, and then returns to the first category, the active program will be the program that was active when the viewer left the first category. The viewer therefore does not need to re-scan the programs in the first category to locate the most recently considered program in that category.

A selection actuator 62 (labeled "SELECT") may be used by the viewer to select the active program (as indicated by the active program bar 48) for viewing. When the selection actuator 62 is activated, the list mode screen 40 disappears and the full-length video program that was selected by the viewer begins. After the program has completed, the list mode screen 40 returns to allow the viewer to make another selection.

In some situations, the still image from the active program that appears in the still image window 42 may not provide enough information for the viewer to make a program selection. The interactive interface thus offers the preview mode and the information mode to provide the viewer with even more information to facilitate program selection.

The different operational modes of the interactive interface are selected by the viewer through the use of three actuators in a mode selection bar 64. On the left side of the mode selection bar 64 is a list mode actuator 66 (labeled "A LIST"). When the list mode screen 40 is displayed, the list mode actuator 66 is preferably highlighted to show that the list mode is the current mode of operation. The list mode actuator 66 is active only when the interactive interface is operating in either the preview mode or the information mode. Any depressions of the button on the control unit 38 (FIG. 5) corresponding to the list mode actuator 66 have no effect on the operational mode when the list mode actuator 66 is highlighted.

A preview mode actuator 68 (labeled "B PREVU") is positioned in the center of the mode selection bar 64. The preview mode actuator 68 may be used by the viewer to cause the interactive interface to switch to the preview mode. As described below in connection with FIG. 7, the preview mode is used to provide the viewer with a full-motion preview of the active program.

An information mode actuator 70 (labeled "C MORE") appears on the right side of the mode selection bar 64. The information mode actuator 70 may be used by the viewer to cause the interactive interface to switch to the information mode. As described below in connection with FIG. 8, the information mode is used to provide the viewer with a textual description of the active program. Preferably, the graphics computer 30 (FIG. 5) causes the monitor 34 (FIG. 5) to play background music while the information mode is active. Background music may also be provided during the list mode.

When the viewer activates the preview mode actuator 68, a preview mode screen 72 is displayed, as shown in FIG. 7. In the preview mode, the display window 42 serves a single large window for displaying a full-motion preview of the active program (i.e., the program that was highlighted by the active program bar 48 in the list mode shown in FIG. 6). Preferably, the full-motion preview lasts for about 30 seconds, and includes video and audio components. The title of the active program appears in the lower portion of the display window 42.

The preview mode screen 72 also includes the category selection bar 50, the program selection bar 56, and the mode selection bar 64. It should be noted that the preview mode actuator 68 becomes inactive while the interactive interface is operating in the preview mode, and accordingly, the preview mode actuator is highlighted on the preview mode screen 72. However, the other actuators described above in connection with the various selection bars, as well as the selection actuator 62, remain active during the full-motion preview.

Through the use of the above-described actuators, the viewer can perform the functions described above in connection with the list mode screen 40 (FIG. 6). For example, the viewer can use the previous category actuator 52 and the next category actuator 54 to change the active category. Also, the viewer can use the previous program actuator 58 and the next program actuator 60 to change the active program within the active category. When the viewer makes such changes, the full-motion preview being displayed in the display window 42 changes accordingly. This allows the viewer to rapidly scan through several full-motion previews without having to return to the list mode screen 40 (FIG. 6).

The list mode actuator 66 may be used to return to list mode if the viewer desires to review the list of available programs in a menu-based format. If the viewer changed the active program or active category while in the preview mode, the changes are "remembered" by the interactive interface, and the active program bar 48 (FIG. 6) in the list mode appears on the program title that corresponds to the program most recently made active during the preview mode.

The selection actuator 62 may also be used from the preview mode screen 72 to begin a full-length presentation of the active program.

The interactive interface is preferably programmed to take one of four courses of action if the viewer does not use one of the available actuators on the preview mode screen 72 before the end of the full-motion preview. In one embodiment, the interactive interface enters a waiting state where it simply waits until the viewer activates one of the various actuators. In another embodiment, the interactive interface returns to the list mode to allow the viewer to consider other programs. In still another embodiment, the interactive interface returns to the mode it was in when the viewer initiated a preview. In yet another embodiment, the interactive interface begins a full-motion preview of the next program in the active category. If the active program is the last in the sequence of programs within the active category, the interactive interface preferably cycles to the first program in the active category. If the fourth embodiment is adopted, the automatic cycling of programs during the preview mode preferably results in a corresponding change in the active program, such that the last program previewed at the time one of the actuators is activated becomes the active program.

From either the list mode screen 40 (FIG. 6) or the preview mode screen 72, the viewer may use the information mode actuator 70 (labeled "C MORE") to switch to an information mode screen 74, which is shown in FIG. 8. While in the information mode, the display window 42 displays textual information pertaining to the actual program. Such information may include, for example, the title of the program, the length of the program, the program's cast, and the director of the program. Of course, this information can be varied in accordance with the type of program being considered.

All of the actuators described above are available for use from the information mode screen 74, with the exception of the information mode actuator 70, which is highlighted. Thus, the viewer can freely change the active program or the active category from the information mode screen 74. Also, the viewer can switch to either the list mode or the preview mode using the appropriate actuator from the mode selection bar 64. The selection actuator 62 may also be used from the information mode screen 74 to begin a full-length presentation of the active program.

As can be seen from the screen examples of FIGS. 6–8, the interactive interface allows the viewer to efficiently acquire information about many available video programs. For example, after designating a particular program as the active program in the list mode screen 40, the viewer can quickly evaluate a still image of the program in the still image window 46. If more information is needed, the viewer can rapidly switch to either the preview mode or the information mode using the appropriate actuators. Further, the active program or active category can be changed in any of the three operational modes, thereby allowing the viewer to consider the same type of information for several different programs in succession. And once the viewer has made a program selection, the selection actuator 62 can be activated from within any of the three modes of operation to begin a full-length presentation of the active program.

Turning now to FIGS. 9A–9H, a series of logic flow diagrams are described which represent a control program that is executed by the graphics computer 30 (FIG. 5). The control program allows the graphics computer 30 (FIG. 5) to provide the interactive interface of the present invention. It also manages communication between the viewing station 14 (FIG. 5) and the telecasting facility 12 (FIG. 2).

Figure 9A:
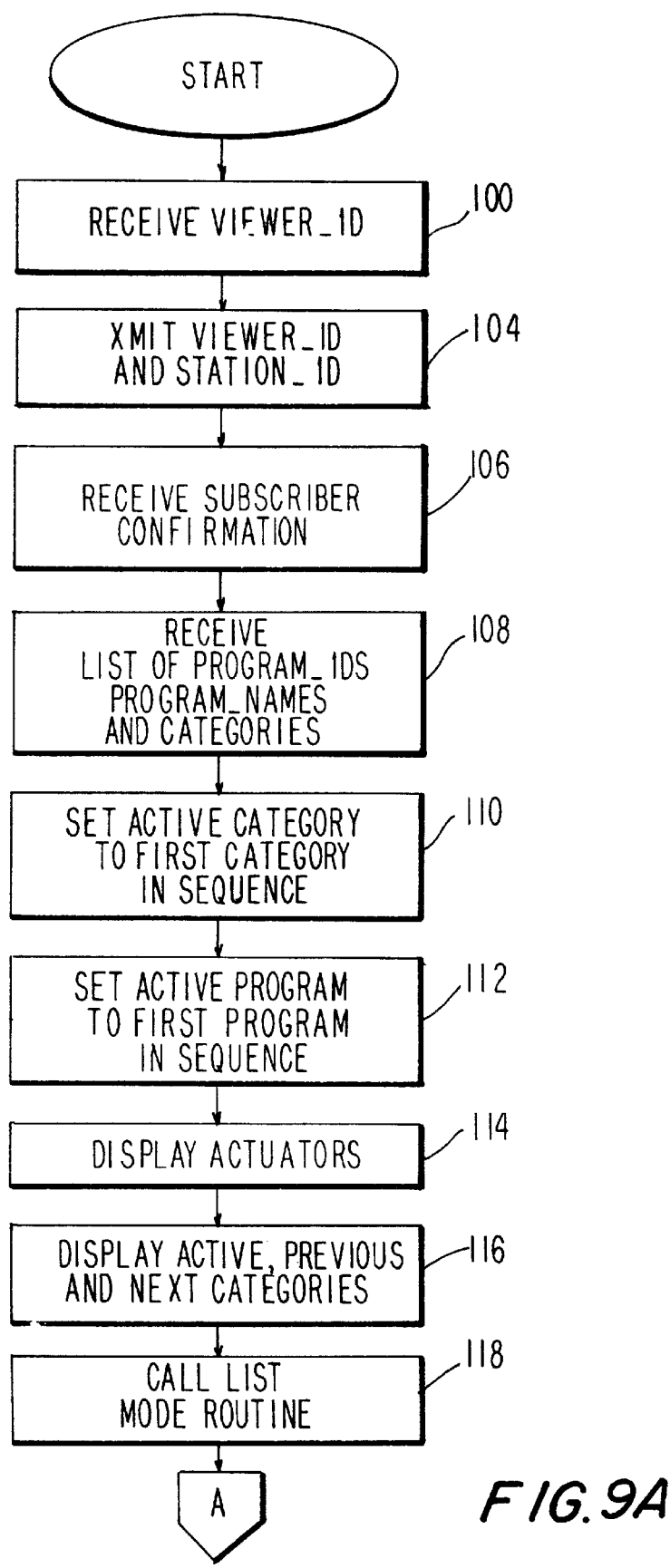

Referring first to FIG. 9A, the control program starts when the viewer selects the demand telecasting service of the present invention from a list of interactive applications available on the interactive channel of the telecasting network 10 (FIG. 1). After start-up, the graphics computer 30 (FIG. 5) receives a VIEWER_ID provided by the viewer at step 100. However, the viewer can choose not to provide a VIEWER_ID at step 100. As explained below, this prevents the viewer from viewing the full-length video programs, but allows the viewer to use the other features of the interactive interface.

It should be understood that the present invention can be practiced without the use of VIEWER_IDS. Indeed, if it is determined that a viewing population would find the task of entering a VIEWER_ID to be cumbersome, it may be preferable to eliminate VIEWER_IDS and any features which require them. For the purposes of the following discussion, it is assumed that the system accommodates VIEWER_IDS. Any modifications required to eliminate VIEWER_IDS would be apparent to one of ordinary skill in the art.

At step 104, the graphics computer 30 (FIG. 5) transmits the VIEWER_ID and a STATION_ID to the telecasting facility 12 (FIG. 2). The STATION_ID is a unique identifier stored in the graphics computer 30 (FIG. 5).

After the telecasting facility 12 (FIG. 2) receives the VIEWER_ID and the STATION_ID, the processing system 22 (FIG. 2) determines if the received information matches an entry in the station table described in connection with FIG. 4. If there is a matching entry, the telecasting facility 12 (FIG. 2) transmits a subscriber confirmation signal, which is received by the graphics computer 30 (FIG. 5) at step 106. Otherwise, the telecasting facility 12 (FIG. 2) transmits a non-subscriber confirmation signal, which is also received at the step 106.

At step 108, the graphics computer 30 (FIG. 5) receives a list of PROGRAM_IDS, PROGRAM_NAMES, and CATEGORIES from the telecasting facility 12 (FIG. 2). If a VIEWER_ID was received at step 100, the list is limited to information pertaining to the programs that the viewer is authorized to view. The processing system 22 (FIG. 2) determines which data are to be transmitted by comparing the CLASSIFICATION data item from the station table (FIG. 4) corresponding to the viewer's VIEWER_ID to the CLASSIFICATION data items in the program table (FIG. 3). This step is useful, for example, for limiting the list of available programs to those that are appropriate for children. If a VIEWER_ID was not received at step 100, the complete list of available video programs is preferably received by the graphics computer 30 (FIG. 5) at step 108.

At step 110, the graphics computer 30 (FIG. 5) sets the active category to the first category in the sequence of categories received at step 108. Then, at step 112, the active program is set to the first program in the sequence of programs within the active category.

At step 114, the actuators described in connection with FIGS. 6–8 are displayed on the monitor 34 (FIG. 5). At step 116, the graphics computer 30 (FIG. 5) then displays the active category in the center of the category selection bar 50 (FIGS. 6–8), the previous category in the sequence (which at this time is actually the last category in the sequence) in the previous category actuator 52 (FIGS. 6–8), and the next category in the sequence in the next category actuator 54 (FIGS. 6–8).

At step 118, the graphics computer 30 (FIG. 5) calls a list mode routine to establish the initial mode of operation for the interactive interface. The list mode routine is described below in connection with FIG. 9C. However, before turning to the list mode routine, the main program loop of the control program, which responds to the viewer's use of the various actuators, will be described.

Figure 9B:
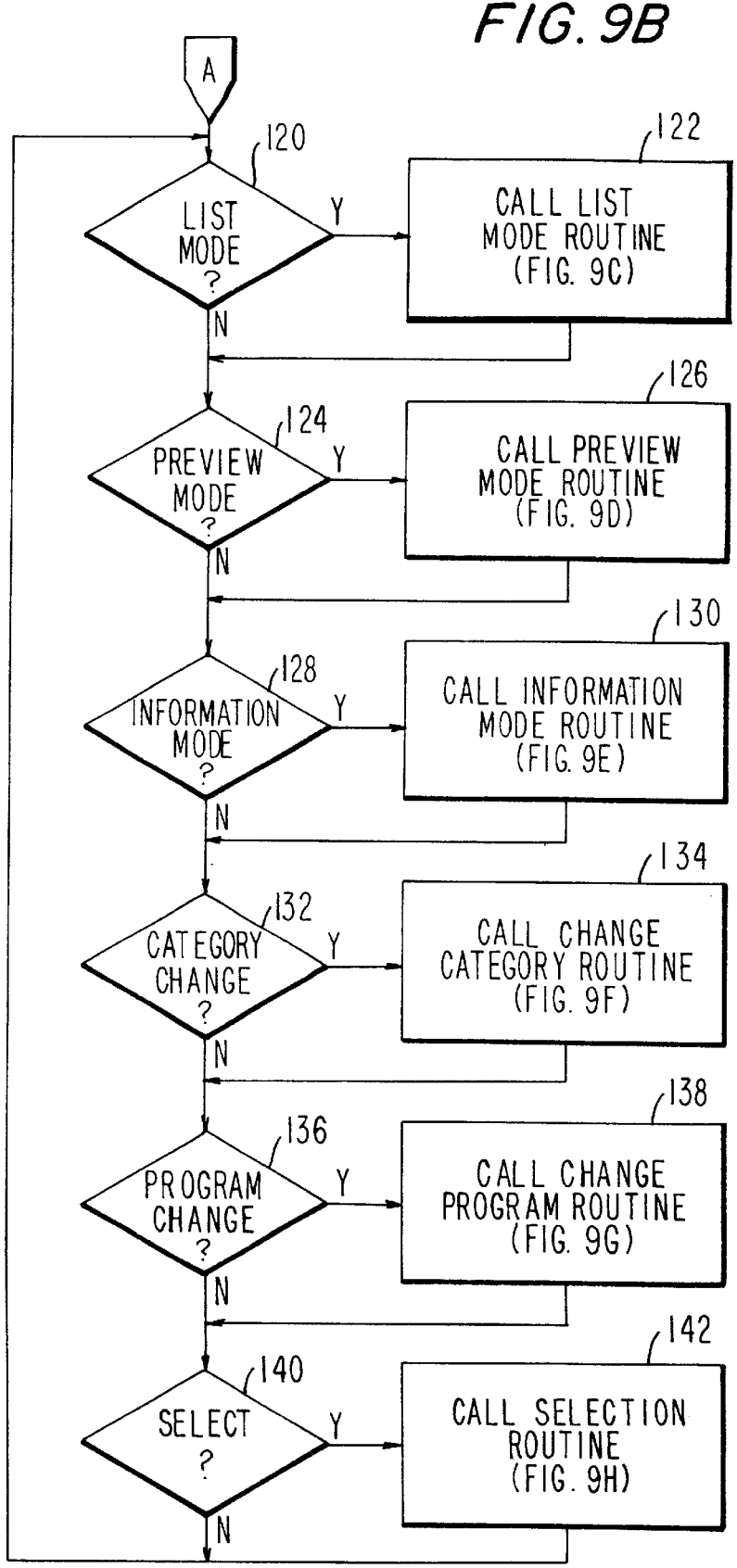

The main program loop is shown in FIG. 9B. It includes a series of six tests that are re-executed until the viewer leaves the interactive interface (typically by changing the channel or turning off the viewing station 14 (FIG. 5) using the control unit 38 (FIG. 5)). The six tests are performed to detect when the viewer activates one of the actuators by pressing one of the corresponding buttons on the control unit 38 (FIG. 5).

At test 120, the graphics computer 30 (FIG. 5) determines if the list mode actuator 66 (FIGS. 6–8) was activated. If so, the list mode routine (FIG. 9C) is called at step 122.

At test 124, the graphics computer 30 (FIG. 5) determines if the preview mode actuator 68 (FIGS. 6–8) was activated. A preview mode routine (FIG. 9D) is called if appropriate at step 126.

At test 128, the graphics computer 30 (FIG. 5) determines if the information mode actuator 70 (FIGS. 6–8) was activated. An information mode routine (FIG. 9E) is called at step 130 when such an activation is detected.

At test 132, the graphics computer 30 (FIG. 5) determines if either the previous category actuator 52 (FIGS. 6–8) or the next category actuator 54 (FIGS. 6–8) was activated. Category changes are handled by a change category routine (FIG. 9F) which is called at step 134.

Similarly, at test 136, the graphics computer 30 (FIG. 5) determines if either the previous program actuator 58 (FIGS. 6–8) or the next program actuator 60 (FIGS. 6–8) was activated. Program changes are handled by a change program routine (FIG. 9G) which is called at step 138.

Finally, test 140 is performed by the graphics computer 30 (FIG. 5) to determine if the selection actuator 62 (FIGS. 6–8) was activated. Program selections are managed by a selection routine (FIG. 9H) which is called at step 142.

Figure 9C:
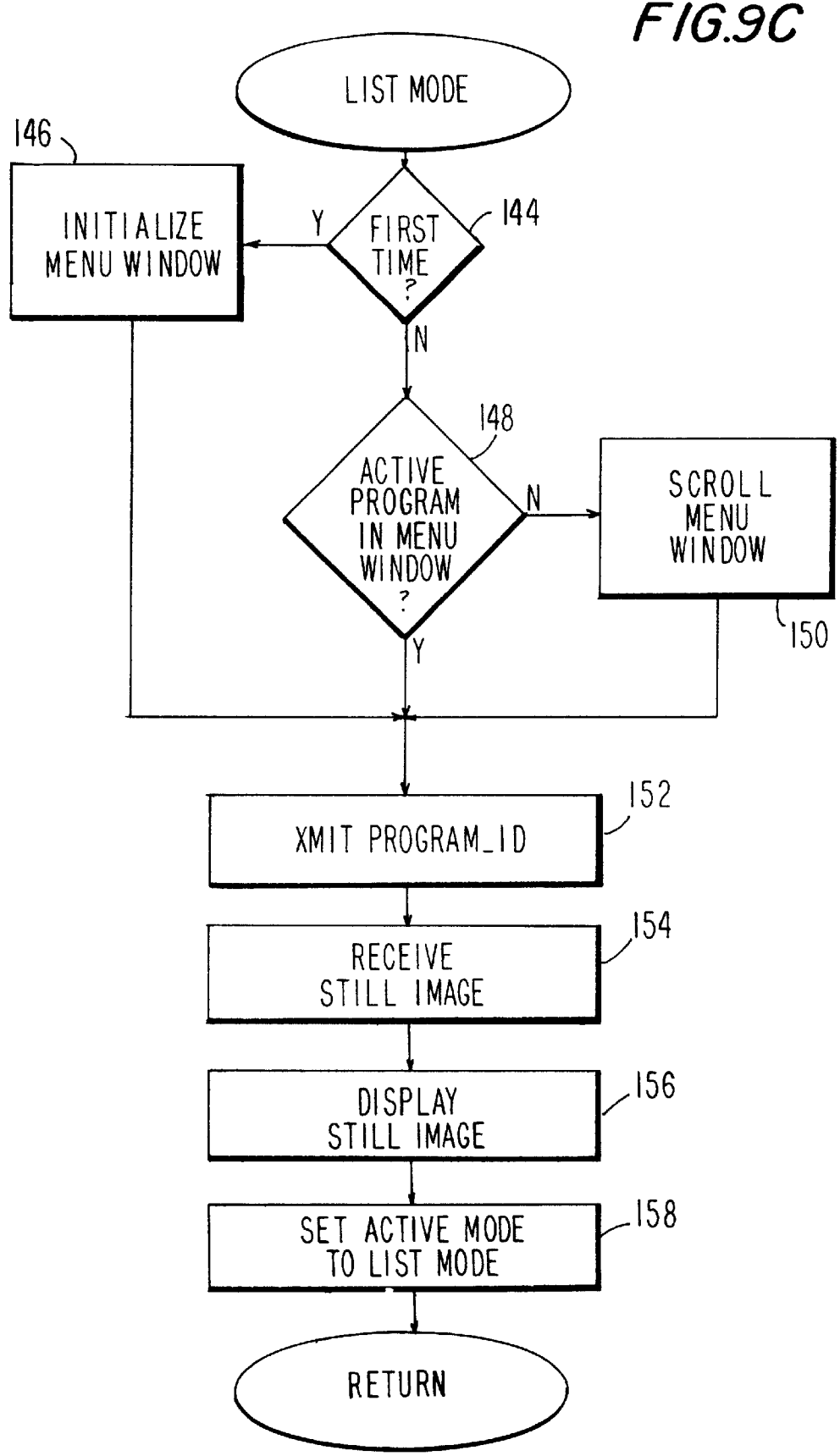

Turning now to FIG. 9C, the list mode routine is described. The list mode routine starts with test 144, where the graphics computer 30 (FIG. 5) determines if the list mode routine is being executed for the first time during the current session of the interactive interface. If so, step 146 is performed to initialize the menu window 44 (FIG. 6). Preferably, the PROGRAM_NAMES of at least the first five programs in the sequence of available programs within the active category are displayed. Since the active program is the first program in the sequence, the active menu bar 48 (FIG. 6) appears on the first displayed PROGRAM_NAME.

If the list mode routine was previously executed during the current session, test 148 is performed to determine if the active program is within the list of PROGRAM_NAMES that was previously displayed in the menu window 44 (FIG. 6). If not, at step 148, the graphics computer 30 (FIG. 5)

scrolls the list of PROGRAM_NAMES, either upwardly or downwardly, to an extent that allows the active program bar 48 (FIG. 6) to appear on the PROGRAM_NAME corresponding to the active program.

At step 152, the graphics computer 30 (FIG. 5) transmits the PROGRAM_ID corresponding to the active program to the telecasting facility 12 (FIG. 2). The processing system 22 (FIG. 2) applies the PROGRAM_ID to the program table (FIG. 4) to determine the name of the data file (STILL_IMAGE) stored in the mass storage system 24 (FIG. 2) that contains the still image data for the active program. The telecasting facility 12 (FIG. 2) then transmits the data file to the graphics computer 30 (FIG. 5), which receives the data at step 154. The graphics computer 30 (FIG. 5) displays the still image in the still image window 46 (FIG. 6) at step 156.

At step 158, the graphics computer 30 (FIG. 5) sets the active mode to the list mode. Control then returns to the main program loop of FIG. 9B.

Figure 9D:
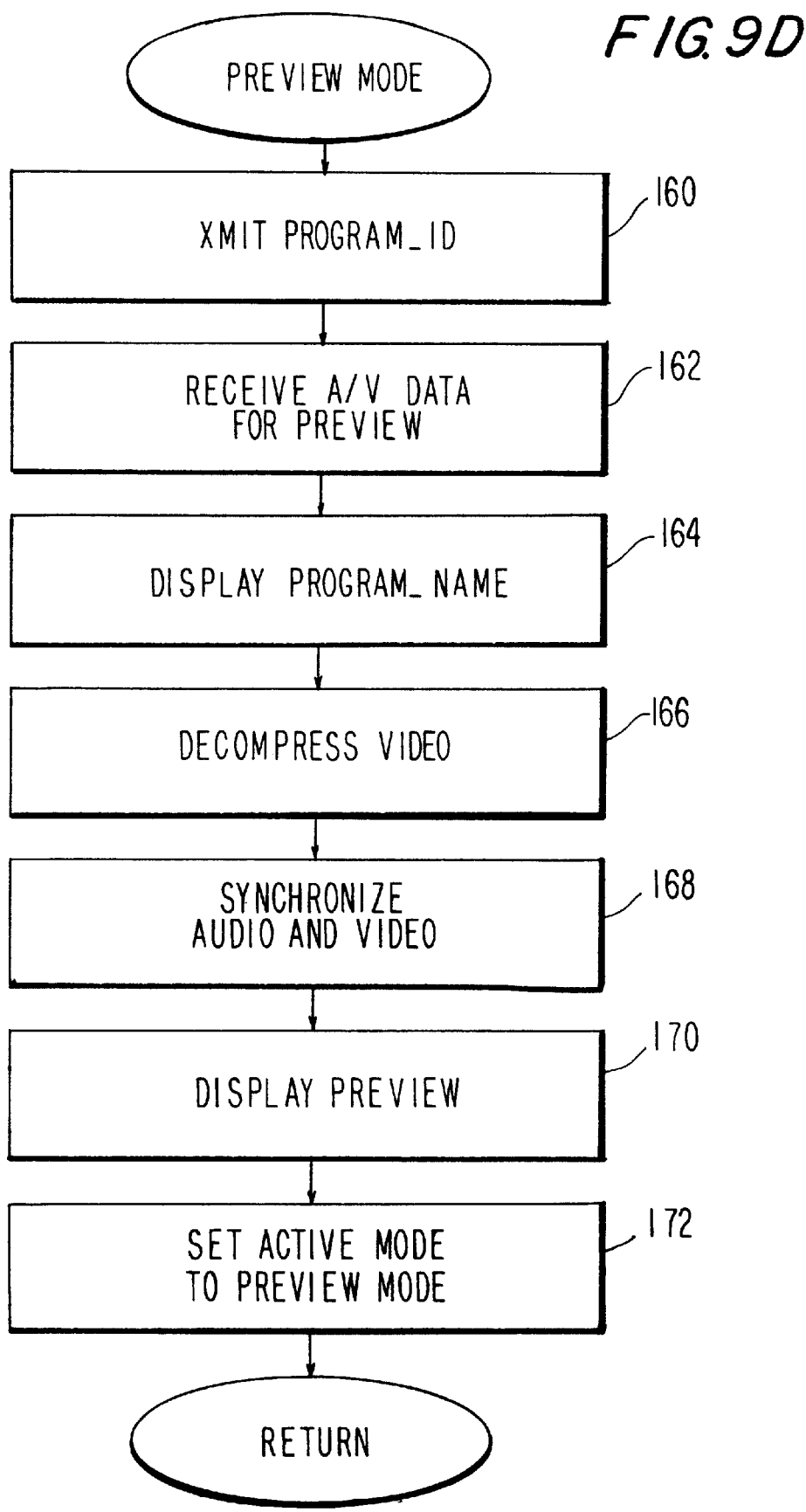

The logic flow diagram for the preview mode routine is shown in FIG. 9D. The preview mode routine starts at step 160, where the graphics computer 30 (FIG. 5) transmits the PROGRAM_ID corresponding to the active program to the telecasting facility 12 (FIG. 2). The processing system 22 (FIG. 2) receives the PROGRAM_ID and applies it to the program table (FIG. 4) to determine the names of the video file (PREVIEW_VIDEO) and the audio file (PREVIEW_AUDIO) stored in the mass storage system 24 (FIG. 2) that contain the data for the full-motion preview for the active program. The processing system 22 (FIG. 2) then transmits the data files to the graphics computer 30 (FIG. 5), which receives the data at step 162.

At step 164, the PROGRAM_NAME of the active program is displayed at the bottom of the display window 42 (FIG. 7). At step 166, the graphics computer 30 (FIG. 5) decompresses the video portion of the data. Then at step 168, graphics computer 30 (FIG. 5) synchronizes the video and the audio portions of the full-motion preview. The synchronized data is provided to the monitor 34 (FIG. 5) for viewing at the step 170. At step 172, the active mode is set to the preview mode.

Preferably, each full-motion preview lasts about 30 seconds. It should be noted that the interactive interface does not linger in the preview mode routine while the preview is running. Rather, the graphics computer 30 (FIG. 5) exits the preview mode routine to return to the main program loop (FIG. 9B) to allow the viewer to use the various actuators while the preview is running. Thus, the viewer can stop a preview by activating either the list mode actuator 66 (FIG. 7), the information mode actuator 70 (FIG. 7) or the selection actuator 62 (FIG. 7).

It should also be noted that several possible courses of action may be taken by the graphics computer 30 (FIG. 5) when a full-motion preview ends. In one embodiment, the graphics computer 30 (FIG. 5) enters a waiting state within the main program loop (FIG. 9B) until the viewer activates one of the various actuators. In another embodiment (not shown), the graphics computer 30 (FIG. 5) resets the interactive interface to the list mode, so that viewer can consider other programs. In still another embodiment (not shown), the graphics computer 30 (FIG. 5) resets the interactive interface to the mode it was in (either the list mode or the information mode) when the user initiated a preview. In yet another embodiment (not shown), the graphics computer 30 (FIG. 5) cycles through full-motion previews of the programs within the active category until the viewer activates one of the various actuators. The particular programming steps required for the second, third, and fourth embodiments can be easily implemented by one of ordinary skill in the art.

Figure 9E:
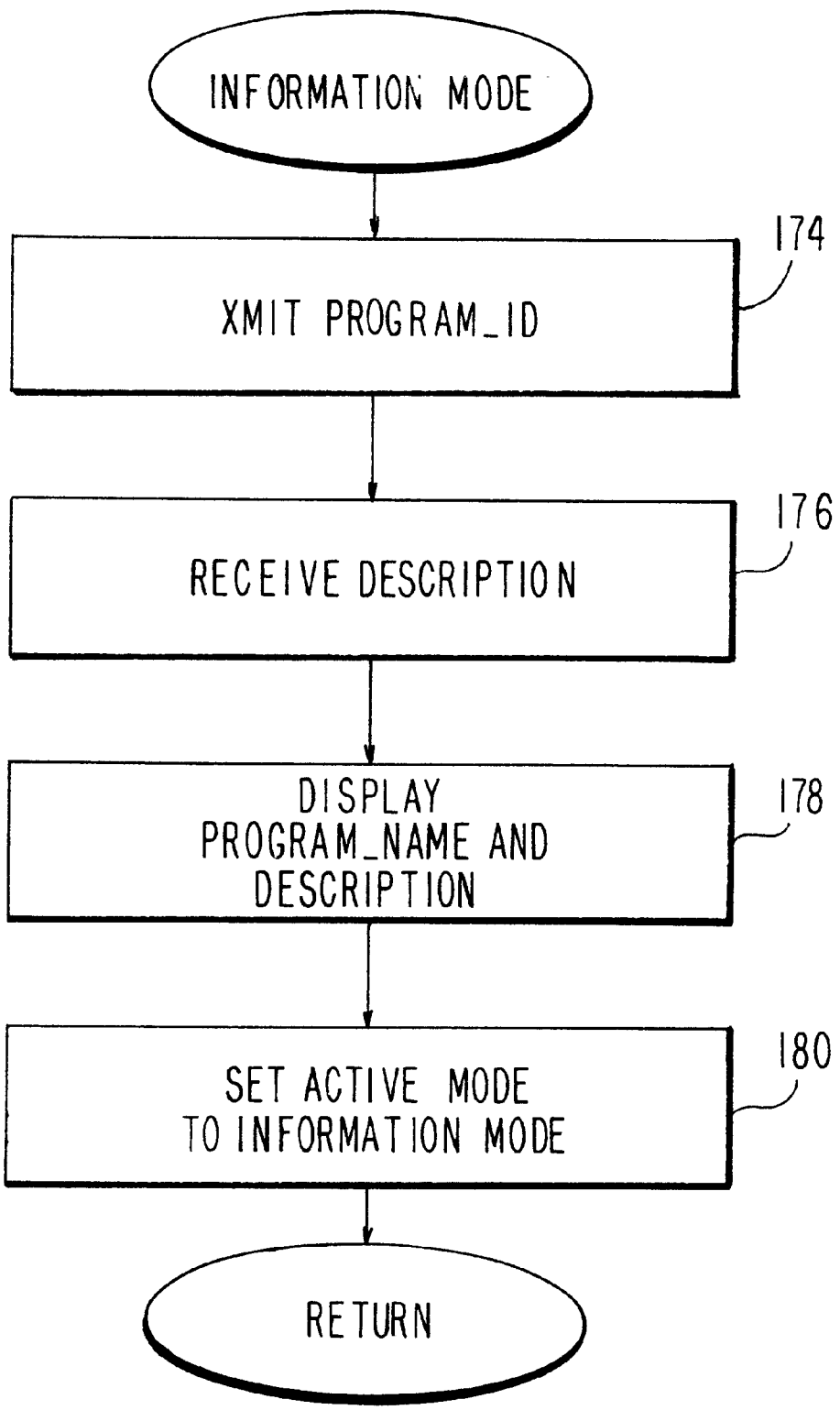

Turning now to FIG. 9E, the information mode routine is described. The information mode routine begins at step 174, where the graphics computer 30 (FIG. 5) transmits the PROGRAM_ID corresponding to the active program to the telecasting facility 12 (FIG. 2). The processing system 22 (FIG. 2) receives the PROGRAM_ID and applies it to the program table (FIG. 4) to extract the DESCRIPTION data item corresponding to the active program. The processing system 22 (FIG. 2) then transmits the DESCRIPTION to the graphics computer 30 (FIG. 5), which receives the data at step 176.

At step 178, the graphics computer 30 (FIG. 5) displays the PROGRAM_NAME and the DESCRIPTION corresponding to the active program in the display window 42 (FIG. 8). The active mode is set to the information mode at step 180, and control then returns to the main program loop (FIG. 9B).

The change category routine is shown in FIG. 9F. The change category routine is executed whenever the viewer actuates either the previous category actuator 52 (FIGS. 6–8) or the next category actuator 54 (FIGS. 6–8).

At test 182, the graphics computer 30 (FIG. 5) determines which of the two category actuators was activated. If the previous category actuator 52 (FIGS. 6–8) was activated, the active category is set to the previous category in the sequence at step 184. The active category may be set to the last category in the sequence if the actuator 52 (FIGS. 6–8) is activated while the first category in the sequence is active. If the next category actuator 54 (FIGS. 6–8) was activated, the active category is set to the next category in the sequence at step 186. The active category may be set to the first category in the sequence if the actuator 54 (FIGS. 6–8) is activated while the last category in the sequence is active. At step 188, the graphics computer 30 (FIG. 5) displays the active, previous, and next categories in the category selection bar 50, as described above in connection with FIGS. 6–8.

At test 190, the graphics computer 30 (FIG. 5) determines whether the category made active at either step 184 or step 186 was ever previously active during the current session. If so, the active program is set to the program that was last active within the active category at step 192. Otherwise, the active program is set to the first program in the sequence of programs within the active category. Test 190 advantageously allows the viewer to quickly return to the most recently considered program within a particular category—without having to re-scan the program list.

Tests 196, 200, and 204 are used by the graphics computer 30 (FIG. 5) to determine the mode that the interactive interface was operating in at the time one of the category actuators was activated. If it is determined at test 196 that the list mode is the active mode, the list mode routine is called at step 198. If it is determined at test 200 that the preview mode is the active mode, the preview mode routine is called at step 202. Or if it is determined at test 204 that the information mode is the active mode, the information mode routine is called at step 206. This sequence of tests and steps causes the interactive interface to return to the active mode and provide the viewer with information corresponding to the new active program.

Figure 9G:
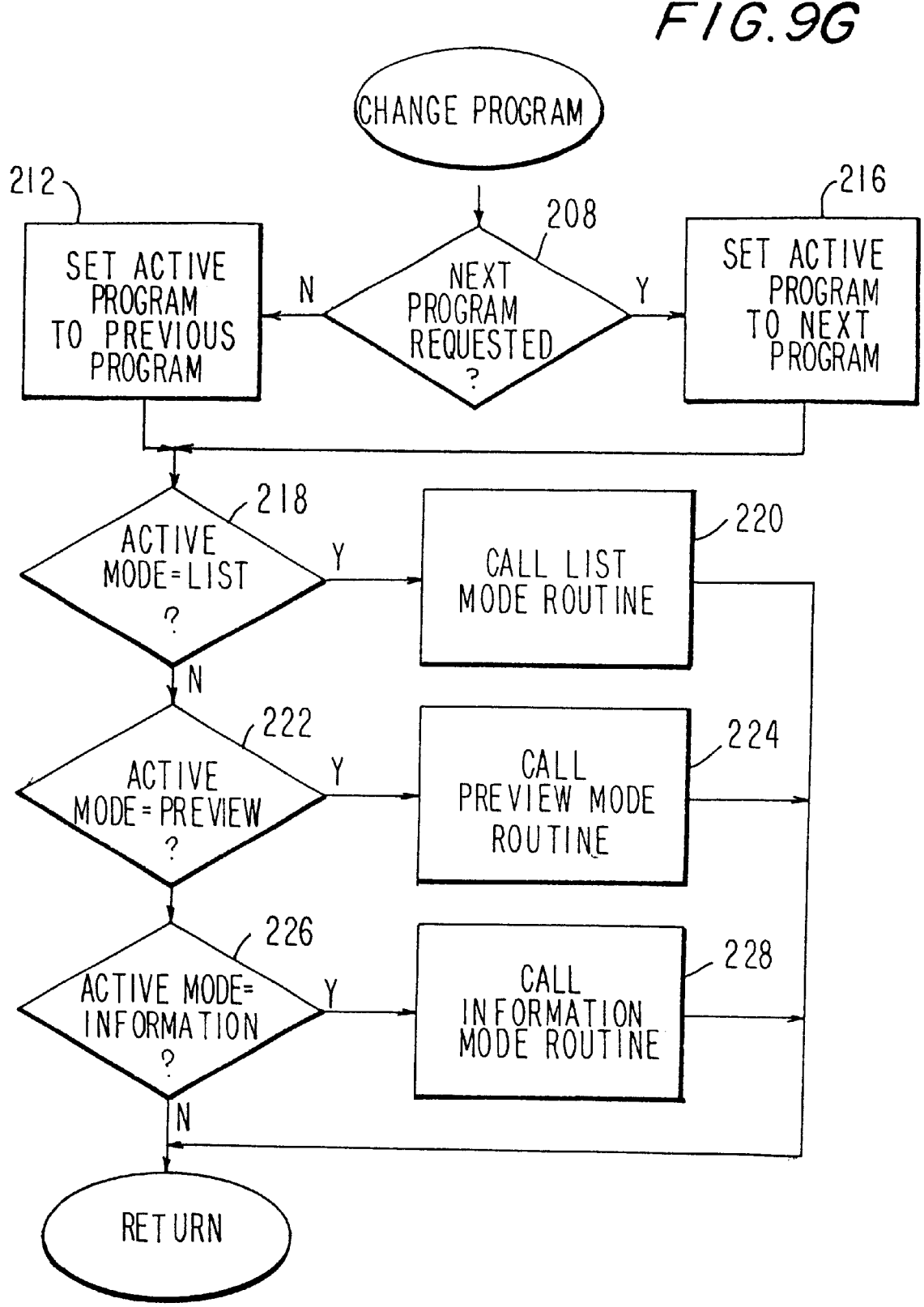

The change program routine is shown in FIG. 9G. The change program routine is executed whenever the viewer actuates either the previous program actuator 58 (FIGS. 6–8) or the next program actuator 60 (FIGS. 6–8).

At test 208, the graphics computer 30 (FIG. 5) determines which of the two program actuators was activated. If the previous program actuator 58 (FIGS. 6–8) was activated, the active program is set to the previous program in the sequence at step 212. The active program may be set to the last program in the sequence if the actuator 58 (FIGS. 6–8) is activated while the first program in the sequence is active. If the next program actuator 60 (FIGS. 6–8) was activated, the active program is set to the next program in the sequence at step 216. The active program may be set to the first program in the sequence if the actuator 60 (FIGS. 6–8) is activated while the last program in the sequence is active.

Tests 218, 222, and 226, and steps 220, 224, and 228 are executed by the graphics computer 30 (FIG. 5) to cause the interactive interface to return to the active mode and provide the viewer with information corresponding to the new active program, as described above in connection with FIG. 9F. Control then returns to the main program loop.

Figure 9H:
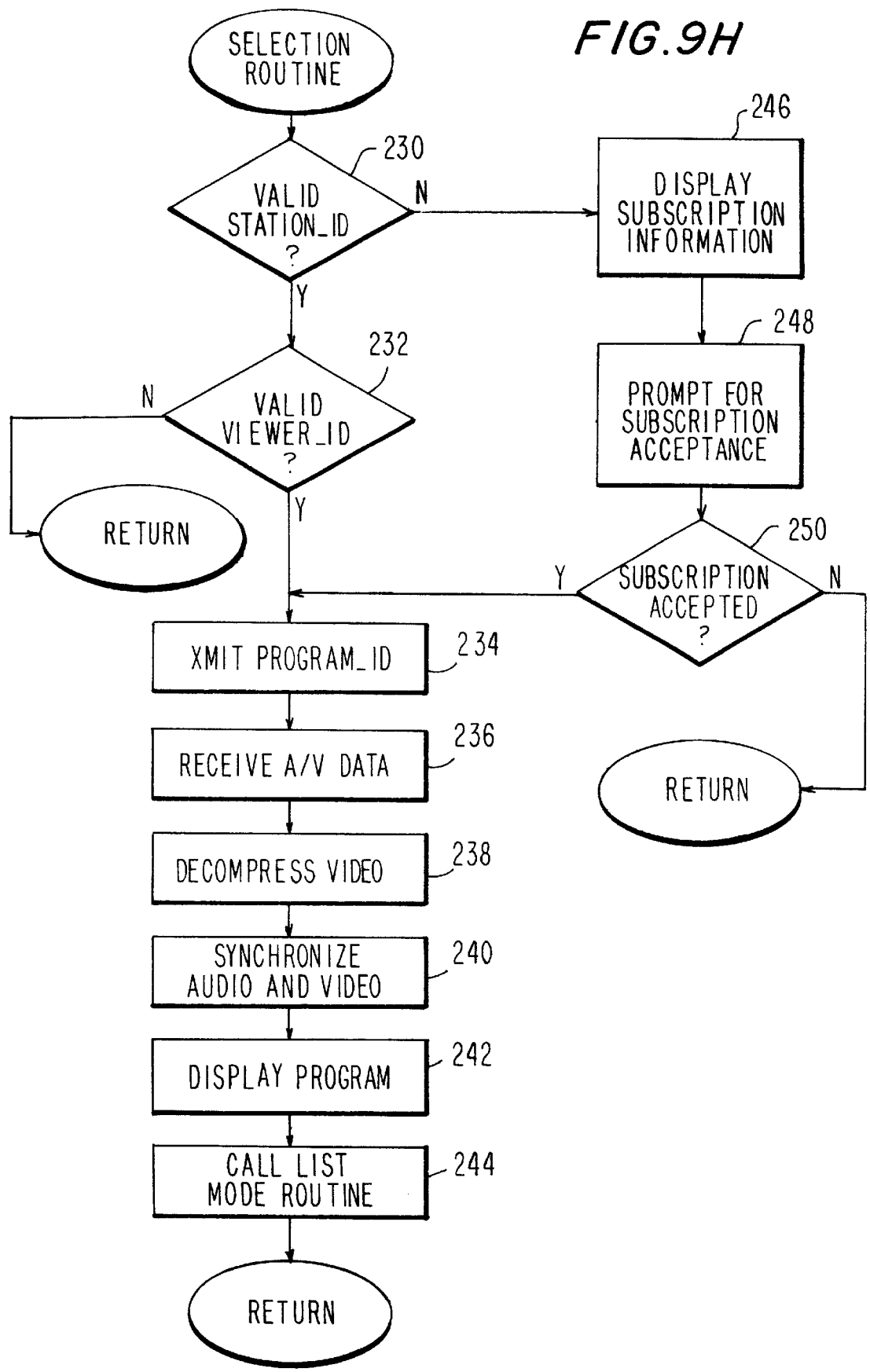

The selection routine, shown in FIG. 9H, is called when the viewer activates the selection actuator 62 (FIGS. 6–8) to view the active program. At test 230, the graphics computer 30 validates the subscriber confirmation data previously transmitted by the telecasting facility 12 (FIG. 2) to determine if the viewing station 14 (FIG. 5) is a subscribing viewing station. If it is, test 232 is performed to determine if the viewer provided a valid VIEWER_ID during the login procedure. If the VIEWER_ID is invalid, control returns to the main program loop. The viewer is thus prevented from viewing the full-length video program unless a valid VIEWER_ID is provided.

If a valid VIEWER_ID was provided, the graphics computer 30 (FIG. 5) transmits the PROGRAM_ID corresponding to the active program to the telecasting facility 12 (FIG. 2) at step 234. The processing system 22 (FIG. 2) receives the PROGRAM_ID and applies it to the program table (FIG. 4) to determine the location of the active program. If the FULL_VIDEO data item indicates that the video program needs to be retrieved from the tape storage unit of the tape drive system 26 (FIG. 2), the processing system 22 (FIG. 2) causes the tape drive system 26 (FIG. 2) to retrieve the appropriate tape and transfer the data to the mass storage system 24 (FIG. 2). Otherwise, the processing system 22 (FIG. 2) uses the FULL_VIDEO and FULL_AUDIO data items to locate the appropriate data files in the mass storage system 24 (FIG. 2). The processing system 22 (FIG. 2) then begins to transmit the data to the graphics computer 30 (FIG. 5) (preferably in packets, as described above), which in turn receives the data at step 236.

At step 238, the graphics computer 30 (FIG. 5) decompresses the video portion of the data. Then at step 240, the graphics computer 30 (FIG. 5) synchronizes the audio and video portions of the data. The synchronized data is provided to the monitor 34 (FIG. 5) for viewing at step 242. It should be noted that the full-length program may last several hours. Accordingly, steps 236, 238, 240, and 242 are repeated as often as necessary to process the large number of data packets that are transmitted from the telecasting facility 12 (FIG. 2) in connection with the presentation of the full-length program.

When the full-length program has completed, the list mode routine is called at step 244. Control then returns to the main program loop (FIG. 9B), so that the viewer can use the interactive interface to consider additional video programs for viewing.

If it is determined at test 230 that the viewing station is not a subscribing viewing station, the graphics computer 30 (FIG. 5) displays a message informing the viewer that only subscribing viewing stations can receive full-length video programs. The graphics computer 30 (FIG. 5) may provide the viewer with subscription information (such as a program schedule, listing of features, etc.) at step 246. Then at step 248, the viewer may be provided with an opportunity to interactively subscribe to the demand telecasting service. Preferably, if interactive subscribing is provided, the viewer is prompted to confirm a new subscription by pressing the button on the control unit 38 (FIG. 5) that corresponds to the selection actuator 62 (FIGS. 6–8). If the viewer presses any other button on the control unit 38 (FIG. 5), it is interpreted as a refusal.

At test 250, the graphics computer 30 (FIG. 5) determines whether the viewer accepted or refused a subscription. If the subscription was refused, control returns to the main program loop (FIG. 9B). Otherwise, the graphics computer 30 (FIG. 5) preferably assigns a temporary VIEWER_ID to the viewer so that the viewer can view full-length programs (as described above in connection with steps 234, 236, 238, 240, and 242) until the subscription is confirmed. It is contemplated that new subscriptions will be confirmed by mail, telephone, or other suitable means.

Thus a telecasting service is provided that offers video programs upon viewer demand, and which includes an interactive interface for facilitating viewer selection of video programs. One skilled in the art will appreciate that the present invention can be practiced by other than the described embodiments, which are presented for purposes of illustration and not of limitation, and the present invention is limited only by the claims which follow.

What is claimed is:

1. A machine-readable data storage medium encoded with a set of machine-executable instructions for performing a method of facilitating selection by users of programming available through an interactive video-on-demand service for display on a display unit, said programming including a plurality of full-length programs and a plurality of previews corresponding respectively to said plurality of full-length programs, said users including subscribers and non-subscribers of said service, said method comprising:

displaying a list of said plurality of full-length programs available for selection, said list available to subscribers and non-subscribers;

displaying a preview of a full-length program, said preview available to subscribers and non-subscribers; and displaying a selected full-length program, said selected full-length program available only to subscribers.

2. The machine-readable data storage medium of claim 1 wherein said method, as encoded, further comprises displaying textual information corresponding to a full-length program, said information available to subscribers and non-subscribers.

3. The machine-readable data storage medium of claim 2 wherein said method, as encoded, further comprises initiating said displaying of a selected full-length program for a subscriber while said subscriber is displaying one of said list, said preview, and said information.

4. The machine-readable data storage medium of claim 2 wherein said method, as encoded, further comprises moving to any one of said displaying a list, a preview, and textual information from any other one of said displaying a list, a preview, and textual information, said moving available to subscribers and non-subscribers.

5. The machine-readable data storage medium of claim 1 wherein said method, as encoded, further comprises soliciting a non-subscriber to become a subscriber substantially immediately after said non-subscriber attempts to display a full-length program.

6. The machine-readable data storage medium of claim 1 wherein said method, as encoded, further comprises informing a non-subscriber whether said non-subscriber's subscription request has been accepted.

7. The machine-readable data storage medium of claim 1 wherein said method, as encoded, further comprises scrolling through programs in said list.

8. A subscription video system that facilitates selection of programming by users for display on a display unit, said programming including full-length programs and previews of said full-length programs, said users including subscribers and non-subscribers of a video-on-demand service, said system comprising:

a user input device that allows users to input selections of programming available in said subscription video system, said input device comprising at least one actuator operable by a user; and a computer processor that receives said selections from said users, said processor determining whether a selection is from a subscriber or a non-subscriber, wherein said processor:
allows display of previews of programs selected by subscribers and non-subscribers;
allows display of full-length programs selected by subscribers; and
prevents display of full-length programs selected by non-subscribers.

9. The system of claim 8, wherein, substantially immediately after preventing display of a full-length program selected by a non-subscriber, said processor solicits said non-subscriber to become a subscriber.

10. The system of claim 8 wherein said processor further allows a non-subscriber to become substantially immediately a subscriber.

11. The system of claim 8 wherein said processor further allows a plurality of selectable lists of said full-length programs to be displayed to subscribers and non-subscribers.

12. The system of claim 8 wherein said processor further allows a still image corresponding to a full-length program to be displayed to subscribers and non-subscribers.

13. The system of claim 8 wherein said processor further allows a textual description corresponding to a full-length program to be displayed to subscribers and non-subscribers.

14. A program selection system for interactive selection of programming by subscribers and non-subscribers of a video-on-demand service for display on a display unit, said programming including full-length programs and previews of said full-length programs, said system comprising:

means for providing at least one program selection menu for subscribers and non-subscribers;
means for receiving program selections from subscribers and non-subscribers;
means for allowing display of previews of full-length programs selected by subscribers and non-subscribers;
means for allowing display of full-length programs selected by subscribers; and
means for preventing display of full-length programs selected by non-subscribers.

15. The system of claim 14 further comprising means for assigning each subscriber a unique identifier for determining whether to display a selected full-length program.

16. The system of claim 15 further comprising:

means for receiving an identifier; and
means for determining whether said identifier corresponds to a subscriber.

17. The system of claim 14 further comprising means for notifying a non-subscriber substantially immediately after selection of a full-length program by said non-subscriber that display of said full-length programs is for subscribers only.

18. The system of claim 14 further comprising means for soliciting a non-subscriber to become a subscriber substantially immediately after selection of a full-length program by said non-subscriber.

19. The system of claim 18 further comprising:

means for processing substantially immediately a request by said non-subscriber to become a subscriber; and
means for notifying said non-subscriber substantially immediately after said processing whether said request was accepted.

20. The system of claim 14 wherein said means for providing at least one program selection menu comprises means for displaying a list of full-length programs available for selection.

21. The system of claim 20 wherein said means for providing at least one program selection menu further comprises means for scrolling through said list of full-length programs.

22. The system of claim 20 wherein said means for providing at least one program selection menu further comprises means for displaying a still image corresponding to a full-length program on said list.

23. The system of claim 20 wherein said means for providing at least one program selection menu further comprises means for displaying textual information corresponding to a full-length program on said list.

24. The system of claim 14 wherein each said full-length program is categorized into at least one of a plurality of program categories and means for providing at least one program selection menu comprises means for providing a plurality of program selection menus corresponding respectively to said plurality of program categories, each one of said plurality of program selection menus displaying a list of categorized full-length programs.

25. The system of claim 24 wherein said means for providing a plurality of program selection menus further comprises means for selecting other ones of said plurality of program selection menus.

26. The system of claim 14 wherein said means for providing at least one program selection menu comprises:

means for providing a list mode;
means for providing an information mode; and
means for providing a preview mode.

27. The system of claim 26 wherein said means for providing at least one program selection menu further comprises means for initiating display of a full-length program for a subscriber from any one of said list, said information, and said preview modes.

28. The system of claim 26 wherein said means for providing at least one program selection menu further comprises means for moving to any one of said list, said information, and said preview modes from any other one of said list, said information, and said preview modes, said means for moving available to subscribers and non-subscribers.

29. A method of facilitating selection by users of programming available through an interactive video-on-demand service for display on a display unit, said programming including a plurality of full-length programs and a plurality of previews corresponding respectively to said plurality of full-length programs, said users including subscribers and non-subscribers of said service, said method comprising:

displaying a list of said plurality of full-length programs available for selection, said list available to subscribers and non-subscribers;

displaying a preview of a full-length program, said preview available to subscribers and non-subscribers; and displaying a user-selected full-length program, said user-selected full-length program available only to subscribers.

30. The method of claim 29 further comprising displaying textual information corresponding to a full-length program, said information available to subscribers and non-subscribers.

31. The method of claim 30 further comprising initiating said displaying of a user-selected full-length program for a subscriber while said subscriber is displaying any one of said list, said preview, and said information.

32. The method of claim 30 further comprising moving to any one of said displaying a list, a preview, and textual information from any other one of said displaying a list, a preview, and textual information by subscribers and non-subscribers.

33. The method of claim 29 further comprising soliciting a non-subscriber to become a subscriber substantially immediately after said non-subscriber attempts to display a full-length program.

34. The method of claim 29 further comprising informing a non-subscriber whether said non-subscriber's subscription request has been accepted.

35. The method of claim 29 further comprising scrolling through programs in said list.

36. A method of facilitating selection of programming by users for display on a display unit, said programming including full-length programs and previews of said full-length programs, said users including subscribers and non-subscribers of a video-on-demand service, said method comprising:

allowing users to input selections of said programming;

receiving said selections from said users;

determining whether a selection is from a subscriber or a non-subscriber;

allowing display of previews of programs selected by subscribers and non-subscribers;

allowing display of full-length programs selected by subscribers; and preventing display of full-length programs selected by non-subscribers.

37. The method of claim 36 further comprising soliciting a non-subscriber to become a subscriber substantially immediately after preventing display of a full-length program selected by said non-subscriber.

38. The method of claim 36 further comprising allowing a non-subscriber to become substantially immediately a subscriber.

39. The method of claim 36 further comprising allowing a plurality of selectable lists of said full-length programs to be displayed to subscribers and non-subscribers.

40. The method of claim 36 further comprising allowing a still image corresponding to a full-length program to be displayed to subscribers and non-subscribers.

41. The method of claim 36 further comprising allowing a textual description corresponding to a full-length program to be displayed to subscribers and non-subscribers.

42. A method of interactively selecting programming by subscribers and non-subscribers of a video-on-demand service for display on a display unit, said programming including full-length programs and previews of said full-length programs, said method comprising:

providing at least one program selection menu for subscribers and non-subscribers;

receiving program selections from subscribers and non-subscribers;

allowing display of previews of full-length programs selected by subscribers and non-subscribers;

allowing display of full-length programs selected by subscribers; and preventing display of full-length programs selected by non-subscribers.

43. The method of claim 42 further comprising assigning each subscriber a unique identifier for determining whether to display a selected full-length program.

44. The method of claim 43 wherein said receiving program selections further comprises:

receiving an identifier; and determining whether said identifier corresponds to a subscriber.

45. The method of claim 42 further comprising notifying a non-subscriber substantially immediately after selection of a full-length program by said non-subscriber that display of said full-length programs is for subscribers only.

46. The method of claim 42 further comprising soliciting a non-subscriber to become a subscriber substantially immediately after selection of a full-length program by said non-subscriber.

47. The method of claim 46 further comprising:

processing substantially immediately a request by said non-subscriber to become a subscriber; and notifying said non-subscriber substantially immediately after said processing whether said request was accepted.

48. The method of claim 42 wherein said providing at least one program selection menu comprises displaying a list of full-length programs available for selection.

49. The method of claim 48 wherein said providing at least one program selection menu further comprises providing at least one actuator for scrolling through said list of full-length programs.

50. The method of claim 48 wherein said providing at least one program selection menu further comprises displaying a still image corresponding to a full-length program on said list.

51. The method of claim 48 wherein said providing at least one program selection menu further comprises displaying textual information corresponding to a full-length program on said list.

52. The method of claim 44 wherein said providing at least one program selection menu comprises:

categorizing each said full-length program into at least one of a plurality of program categories; and providing a plurality of program selection menus corresponding respectively to said plurality of program categories, each one of said plurality of program selection menus displaying a list of categorized full-length programs.

53. The method of claim 52 wherein said providing a plurality of program selection menus further comprises providing at least one category actuator for selecting other ones of said plurality of program selection menus.

54. The method of claim 44 wherein said providing at least one program selection menu comprises:

providing a list mode;

providing an information mode; and providing a preview mode.

55. The method of claim 54 further comprising initiating display of a full-length program for a subscriber from any one of said list, said information, and said preview modes.

56. The method of claim 54 further comprising moving to any one of said list, said information, and said preview modes from any other one of said list, said information, and said preview modes by subscribers and non-subscribers.

* * * * *